(12) United States Patent
Nabi

(10) Patent No.: US 11,429,754 B2
(45) Date of Patent: Aug. 30, 2022

(54) SYSTEM TO PREVENT VISUAL HACKING

(71) Applicant: Tahsin Nabi, Kennesaw, GA (US)

(72) Inventor: Tahsin Nabi, Kennesaw, GA (US)

(73) Assignee: Tahsin Nabi, Kennesaw, GA (US)

(*) Notice: Subject to any disclaimer, the term of this patent is extended or adjusted under 35 U.S.C. 154(b) by 0 days.

(21) Appl. No.: 17/349,677

(22) Filed: Jun. 16, 2021

(65) Prior Publication Data
US 2021/0312094 A1 Oct. 7, 2021

Related U.S. Application Data

(60) Provisional application No. 63/066,559, filed on Aug. 17, 2020.

(51) Int. Cl.
*G06F 21/84* (2013.01)

(52) U.S. Cl.
CPC .................... *G06F 21/84* (2013.01)

(58) Field of Classification Search
None
See application file for complete search history.

(56) References Cited

U.S. PATENT DOCUMENTS

| | | | |
|---|---|---|---|
| 2014/0013422 A1* | 1/2014 | Janus | G06F 21/32 726/19 |
| 2014/0282721 A1* | 9/2014 | Kuncl | G06Q 10/10 725/35 |
| 2015/0116212 A1* | 4/2015 | Freed | G06F 21/6245 345/156 |
| 2016/0246979 A1* | 8/2016 | Rakshit | G06F 21/6218 |
| 2017/0040002 A1* | 2/2017 | Basson | G06F 21/84 |
| 2018/0300510 A1* | 10/2018 | Lam | G06F 21/6245 |
| 2021/0012036 A1* | 1/2021 | Franzo | G06F 21/6218 |

* cited by examiner

*Primary Examiner* — Kaveh Abrishamkar
(74) *Attorney, Agent, or Firm* — Tahsin Nabi

(57) ABSTRACT

The proposed technology enables new levels of privacy while using electronics in open or public settings via the modification and censorship of a device's displayed content in response to the presence of spectators within a visible range of content displayed. In an open or public environment, users of electronic devices with any form of display can have their privacy and security compromised by any unauthorized spectators within the aforementioned visible range. To combat this problem, the proposed technology monitors the presence of users and spectators within predetermined regions and changes the content displayed appropriately such that the spectators are deterred or prevented from viewing the user's (or users) content. The system provides an added layer of security which is advantageous to users who prefer to use their devices in public locations but are afraid of being visually hacked. The proposed technology would also prove useful on devices which are permanently situated in public locations (ATM's, public computers, etc.).

8 Claims, 25 Drawing Sheets

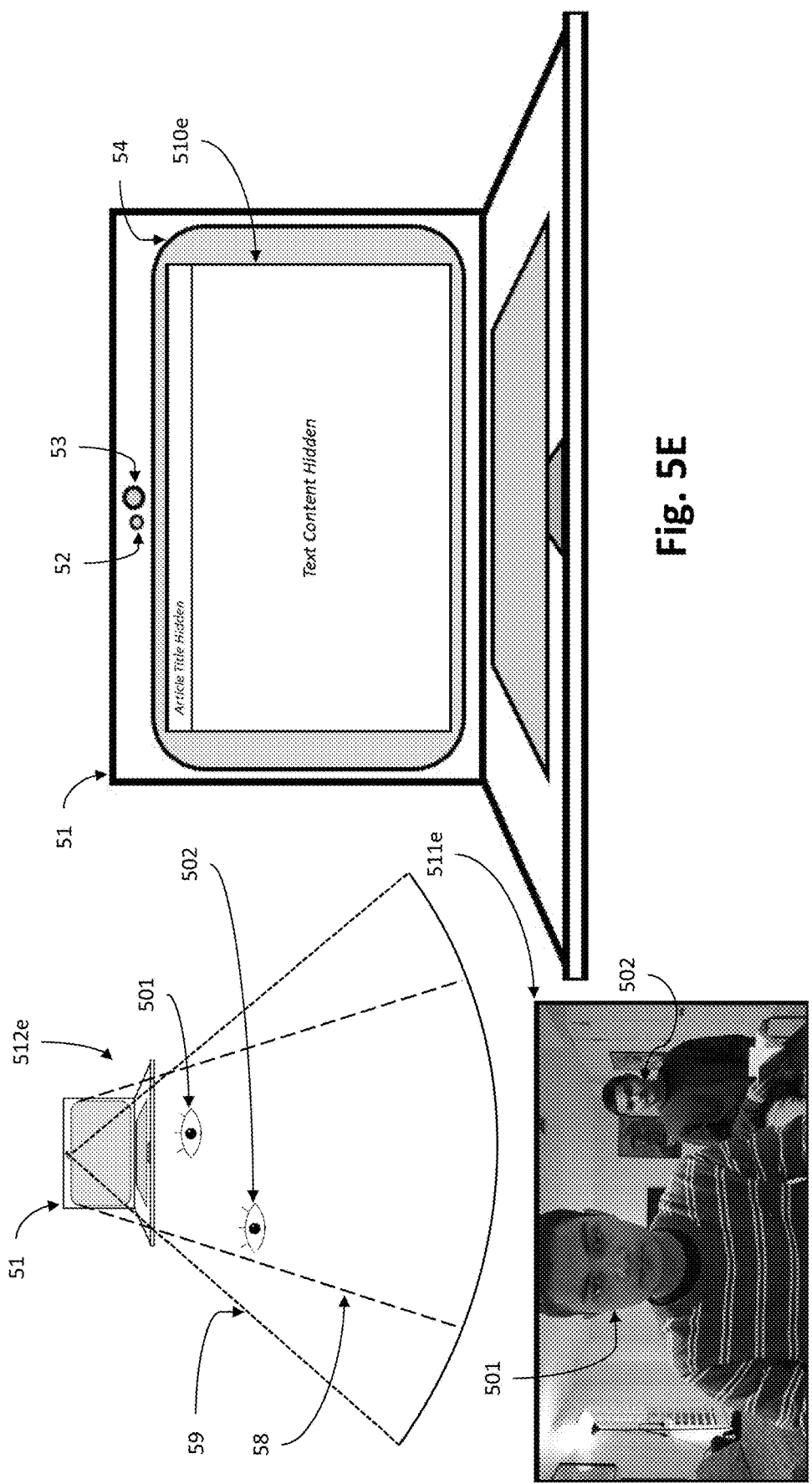

SYSTEM TO PREVENT VISUAL HACKING

CROSS-REFERENCE TO RELATED APPLICATION

This application claims the benefit of U.S. Provisional Patent Application Ser. No. 63/066,559 entitled "System to Prevent Visual Hacking" filed Aug. 17, 2020, which is hereby incorporated by reference in its entirety.

TECHNICAL FIELD

The proposed technology is relevant to the enhancement of privacy of displayed content on a device wherein the device includes personal device used in public settings and/or public device permanently situated in public location such as ATMs and public computers.

BACKGROUND OF THE INVENTION

There is a large demographic of consumers who use their devices in public settings: students who take notes on their laptop in a lecture hall filled with other kids, adults riding public transportation sit shoulder to shoulder with a stranger as they browse the internet, shoppers who use mobile payment applications wait in line with their phones out. Within all of these scenarios, the sensitive data of the consumers is at risk. The student is at risk of being plagiarized by another student, the adult is at risk of losing their privacy, and the shoppers are all at risk of having their sensitive payment information leaked. This act of peering over someone else's shoulder to steal their information or compromise their privacy is often dubbed "shoulder surfing" or "visual hacking". Visual hacking is most rampant in public places (offices, public transportation, stores, etc.) on portable devices (smartphones, laptops, gaming consoles, etc.). Visual hacking however is not limited to portable devices. Automated teller machines (ATMs) are an example of non-portable devices where visual hacking can pose a serious threat to all users.

Recently, many consumers have become cognizant of how vulnerable they are while using technology. The growth of industries which sell user data and metadata have exacerbated consumer concerns over privacy both in person and online. Consumers worry about digital security and their privacy, they download VPN's (Virtual Private Networks) on their laptops and cell phones to hide their sensitive information or purchase cheap privacy screens which limit the viewing angles of their devices to deter others from peeking at their screen. A VPN is great at hiding their transmitted data and browsing history. A privacy screen does stop some people from viewing their screen. However, these technologies (VPN and privacy screen) have their drawbacks. The aforementioned privacy screens (sometimes called privacy filters) severely limit the viewing angles of the device and are often intended to be permanently applied to the device. These privacy protectors make it difficult to display content with multiple users at once because of the fact they are typically permanent. It is unlikely that a user always wants to have this type of privacy, the same hypothetical college student mentioned earlier might transition from a study session at their local coffee shop (where they don't want others to see their screen) to watching a movie with friends on their device at home (where it is inconvenient if only one person can clearly see the screen). Another one of the proposed solutions to this problem involves layering solid color patterns on top of the content being displayed such that while wearing special glasses with the same color tint, the pattern is "invisible" and the user can see the content without obstruction by the pattern. However, corresponding glasses are not always required as the layering of a colored pattern also acts as a deterrent to spectators that makes it difficult for them to view content displayed from a distance. While this solves the issue of having a permanently limited viewing angle, it creates a new problem. This method of providing privacy in public also compromises visibility to the primary user. The different patterns which are layered can obscure the content being displayed on screen, especially if that content happens to be a color similar to the solid pattern. This approach also proves problematic if the user is doing something on their device where color accuracy is important, such as video and photo editing. Therefore, this approach would be more advantageous to the primary user if it activated temporarily in response to a potential spectator instead. However, applications of these approaches as temporary and automated deterrents are, at present, not available. The issue with any and all current solutions to the issue of visual hacking lies in the fact that none of the solutions are reactive to the presence of potential threats.

SUMMARY OF THE INVENTION

The proposed technology, intended for use in traditionally public settings, monitors the viewpoints of spectators who are within the range of a device's display and then alters or censors the content displayed based on the presence of the user(s) and spectators to ensure the privacy of the primary user(s). By monitoring the viewpoint as well as number of total users within two predetermined regions, those being a set display viewing angle and an IR camera's maximum FOV, the technology is able to take action against any potential threats to security prior to the threat gaining visibility of the display outside the viewing angle of the device. Such a feature proves useful across a wide variety of electronics (e.g. game consoles, smartphones, laptops, ATMs) when a user may want to conceal whatever content they are consuming. Naturally the technology might prove battery intensive and situational, so the technology is both toggle-able and configurable by the user.

BRIEF DESCRIPTION OF THE DRAWING

FIG. 5A-FIG. 5H show an exemplary scenario in which a user viewing text on their laptop has their privacy threatened by a single spectator who is not initially deterred by modification of the content.

DETAILED DESCRIPTION OF THE INVENTION

In this detailed description section, a plurality of specific details has been set forth to give a complete understanding of the present invention. It will be clear, however, to a skilled artisan that embodiments of the present invention can be practiced and implemented without some of the specific details. In addition, well-understood concepts, techniques, structures and algorithm to one ordinarily skilled in the art have not been shown in detail or omitted to enhance readability of disclosure and not to obscure the invention.

Figure 1:
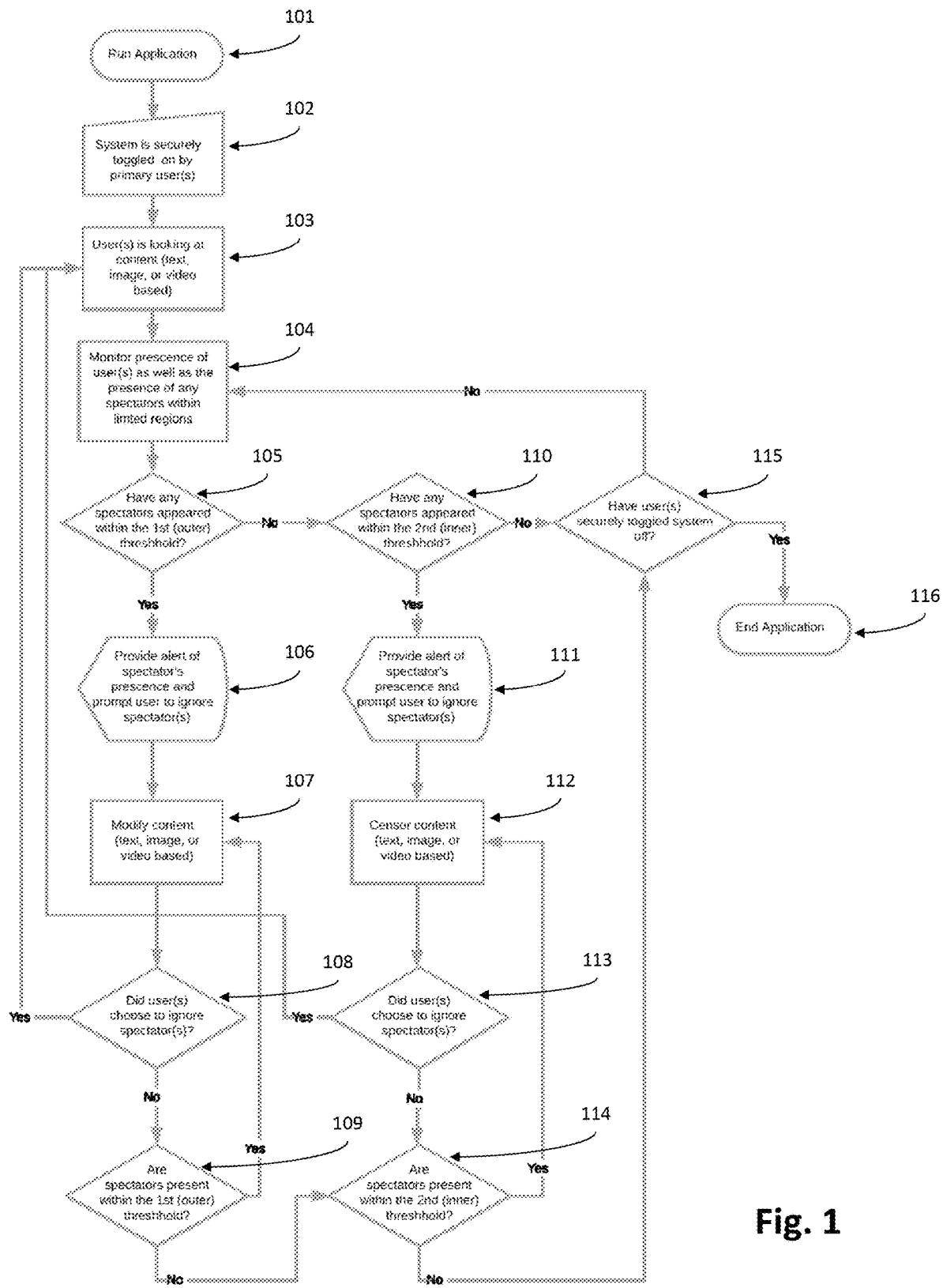
FIG. 1 depicts the exemplary process the system may implement in order to prevent visual hacking.

FIG. 1 shows the exemplary process a computer system may implement in order to ensure the privacy of the primary user's (or users) session within the context of the proposed technology. It is crucial to understand that the exemplary process presented may vary depending on a primary user's configuration of the system in the case that the aforementioned user has specific preferences towards deterring spectators. To begin the process, an application which executes the process on some capable device must be run by the user(s) (101). A capable device within the context of the proposed technology is defined as some electronic device equipped with at minimum, a processor, ram, front facing display with a controlled viewing angle, a near IR camera and/or front facing camera, and a power supply. Once the application is launched, the process requires that the primary user is authenticated (102). It is important to confirm the identity of the primary user when toggling the system on or off to prevent a potential spectator, who is a threat to security, masquerading as the primary user whose sensitive data/content is being displayed in order to steal said sensitive data/content. Once the user(s) are authenticated, via a key phrase, facial recognition, or biometrics, the user will be able to return to the content they wish to browse in private (103) with the assurance that the system will continuously monitor the presence of the user(s) and any potential spectators (104). FIGS. 2A, 3A, 4A, and 5A all depict steps 103 and 104 of the process in which the primary user is browsing text, image, or video based content and the system has not yet detected any threats to privacy.

Once the system has begun monitoring the presence of spectators, there are three key events that will cause the process to exit the loop during which the system continuously monitors the presence of any spectators (104). Event one: spectators appear within the outer threshold, AKA the range of the IR camera's FOV excluding the inner threshold, who are looking towards the display without visibility of the content displayed. Event two: spectators appear within the inner threshold, AKA the viewing range of the display, who are looking towards the display with visibility of the screen. Event three: the primary user decides to disable the system securely. Each of the three events are checked for following step 104 in steps 105, 111, and 117 respectively. If none of the events are occurring, the process loops back around to step 104 and the system continues monitoring the environment as the user(s) browse content (103). In the case that any of these events occur the loop will end and depending on the event and the system will take a unique course of action to deal with the potential threat to privacy or the user's commands.

In the case of event one the process will immediately begin trying to deter the spectator(s) who were discovered in step 105, 109, or 119. Following the detection of the spectators the system will provide an alert to the user(s) containing more information about the presence of the spectator(s) as well as prompt the user to ignore the spectator(s) (106). The content of alerts can vary depending on the configuration of the system by the primary user as do other aspects of the process. FIGS. 2C, 3C, 4C, 5C, and 5F exemplify various styles of alert banners, some containing different content then others. For example, some alerts such as those presented in 3C and 4C show the faces of the spectator(s) within the alert banner such that the primary user can swiftly identify the spectator(s) spying on them. These alert banners contrast with those presented in 2C, 5C, and 5F in which the alert banner is more subtle giving the spectators location relative to the primary user. As the primary user is made aware of the spectator(s), the process simultaneously modifies the content which was being displayed based on the content displayed, user presence, and spectator presence (107). This action, the decision by the system to modify as opposed to censor content, is unique to event one. Considering that spectators outside of the inner threshold lack visibility of the display, it is not necessary to completely censor the content as that would only prevent the user(s) from continuing their private browsing session. This scenario is depicted by FIGS. 2B, 4B, and 5B. After presenting alerts and modifying the content displayed, the process considers the user(s) decision made in step 106 when they were prompted to ignore the spectator(s) (108). If the user chooses to ignore the spectator(s), the process will revert back to step 103 with the spectator(s) now included in the private browsing session as user(s). The decision to ignore the spectator(s) is depicted in FIGS. 2C and 2D by primary user 201. If the user chooses to continue acknowledging the spectator(s) instead, the process will continue its modification of the content until the spectator(s) leave the outer threshold without events two or three occurring, event two occurs or event three occurs. If all spectators leave the outer threshold without events two or three occurring, step 108 of the process will lead into 109 followed by 119, 117, and revert the process back to step 104 where the system is on standby monitoring the presence of users and spectators until any of the three events occurs. If event two occurs, the process will enter a similar loop as the aforementioned modification loop except the system instead opts to censor content from both the user and spectators as within the inner threshold both parties have visibility of the display. This loop, which will be detailed further in the following section, can only be terminated by similar events as that of the modification loop (the process will continue its censorship of the content until the spectator(s) leave the inner threshold without events one or three occurring, event one occurs or event three occurs). If event three occurs the process will force the application to end.

In the case of event two the process will immediately begin trying to hide content from the spectator(s) who were discovered in step 111 or 115. Following the detection of the spectators the system will provide an alert to the user(s) containing more information about the presence of the spectator(s) as well as prompt the user to ignore the spectator(s) (112). The content of alerts can vary depending on the configuration of the system by the primary user as do other aspects of the process. FIGS. 2C, 3C, 4C, 5C, and 5F exemplify various styles of alert banners, some containing different content then others. For example, some alerts such as those presented in 3C and 4C show the faces of the spectator(s) within the alert banner such that the primary user can swiftly identify the spectator(s) spying on them. These alert banners contrast with those presented in 2C, 5C, and 5F in which the alert banner is more subtle giving the spectators location relative to the primary user. As the primary user is made aware of the spectator(s), the process simultaneously censors the content displayed to prevent the spectators from shoulder smurfing (113). This action, the decision by the system to censor as opposed to modify content, is unique to event two. Considering that spectators inside of the inner threshold have visibility of the display, it is necessary to completely censor the content. This scenario is depicted by FIGS. 3B and 4B. After presenting alerts and censoring the content displayed, the process considers the user(s) decision made in step 112 when they were prompted to ignore the spectator(s) (114). If the user chooses to ignore the spectator(s), the process will revert back to step 103 with the spectator(s) now included in the private browsing session as user(s). The decision to ignore the spectator(s) is depicted in FIGS. 2C and 2D by primary user 201. If the user chooses to continue acknowledging the spectator(s) instead, the process will continue its censorship of the content until the spectator(s) leave the outer threshold without events one or three occurring, event one occurs or event three occurs. If all spectators leave the outer threshold without events one or three occurring, step 114 of the process will lead into 115 followed by 119, 117, and revert the process back to step 104 where the system is on standby monitoring the presence of users and spectators until any of the three events occurs. If event one occurs, the process will enter a similar loop as the aforementioned modification loop except the system instead opts to modify content from both the user and spectators as within the outer threshold spectators lack visibility of the display. This loop, which will be detailed earlier in the previous section, can only be terminated by similar events as that of the modification loop (the process will continue its modification of the content until the spectator(s) leave the outer threshold without events two or three occurring, event two occurs or event three occurs). If event three occurs the process will force the application to end.

In the case of event three the process will immediately end the application as soon as the primary user confirms their identity. Event three is not only checked for within the step 104 loop as that would mean that the user(s) would not be able to turn off the application so long as spectators are present. Instead event three is also checked for during the course of action the process takes to deal with events one and two. Steps 110 and 116 both check that the primary user still wants to continue their private session as opposed to ending the application. FIGS. 3D and 4D both depict the process at step 116 in which a spectator is present within the inner threshold, the system has continued its modification/censorship of the content displayed, and the user has opted to disable the system entirely via ending the private browsing session. FIGS. 3E and 4E also therefore depict the step which follows the successful secure toggling off of the system. FIGS. 3E and 4E both depict step 118 in which the application has ended and the system has been disabled.

FIG. 2A-2D illustrate a scenario in which a primary user 201 (who is wearing a striped sweater) has their private browsing session interrupted by a single spectator 202 (who is wearing a solid sweater). The private browsing session is being facilitated via the proposed technology/system running on an imagined laptop 51 or otherwise capable device. A device capable of implementing the proposed technology/system must have an integrated display 54 fitted with a privacy screen/filter which significantly restricts the viewing angles of the display, IR (infrared) or near IR camera 52 in the same direction as the display (front facing) and preferably another normal camera 53 in the same direction as the display (front facing). Within the scenario the singular user 201 is browsing video based content while being situated directly in front of their device.

Figure 2A:
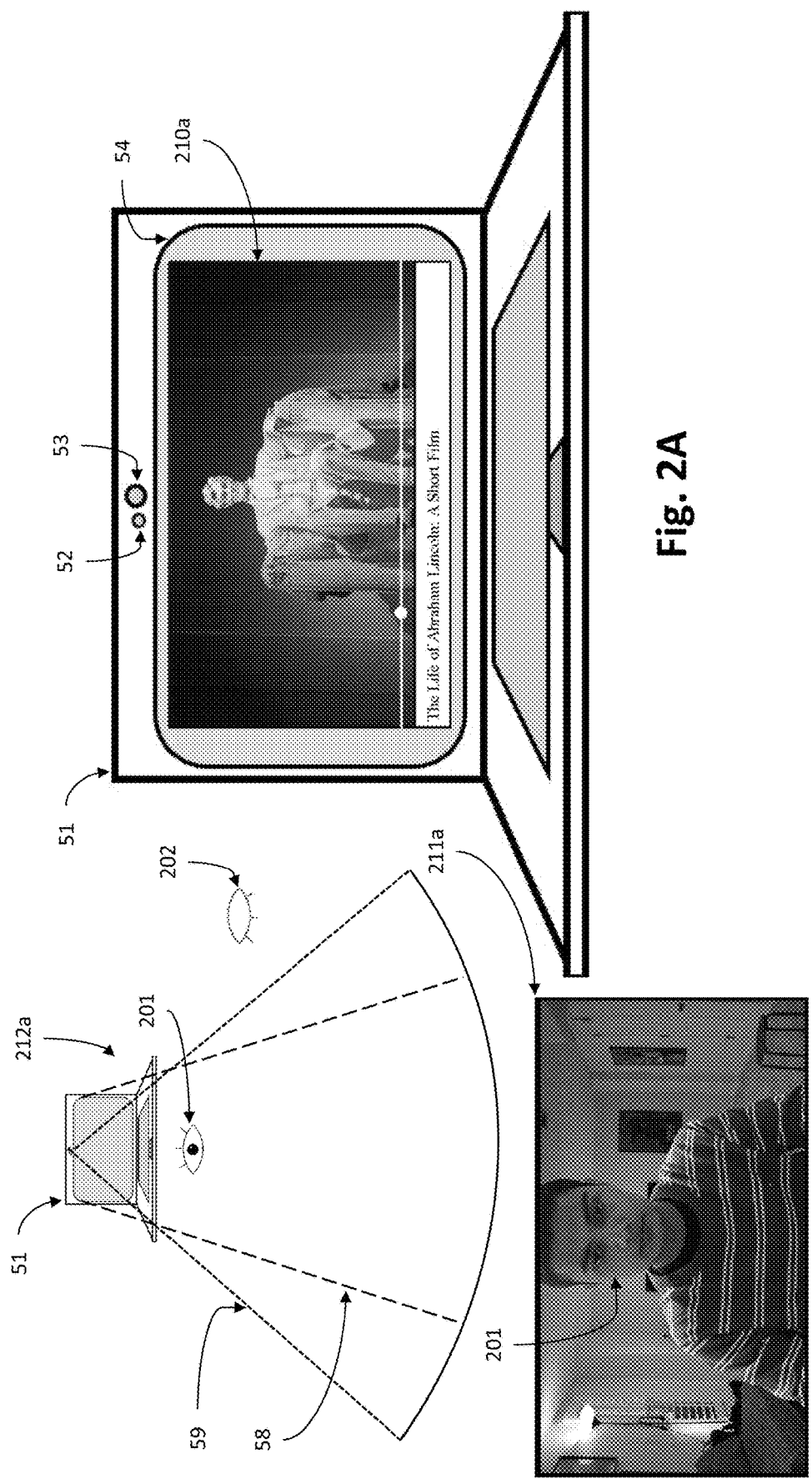
FIG. 2A-FIG. 2D show an exemplary scenario in which a user viewing a video on their laptop has their privacy threatened by a single spectator.
Figure 2B:
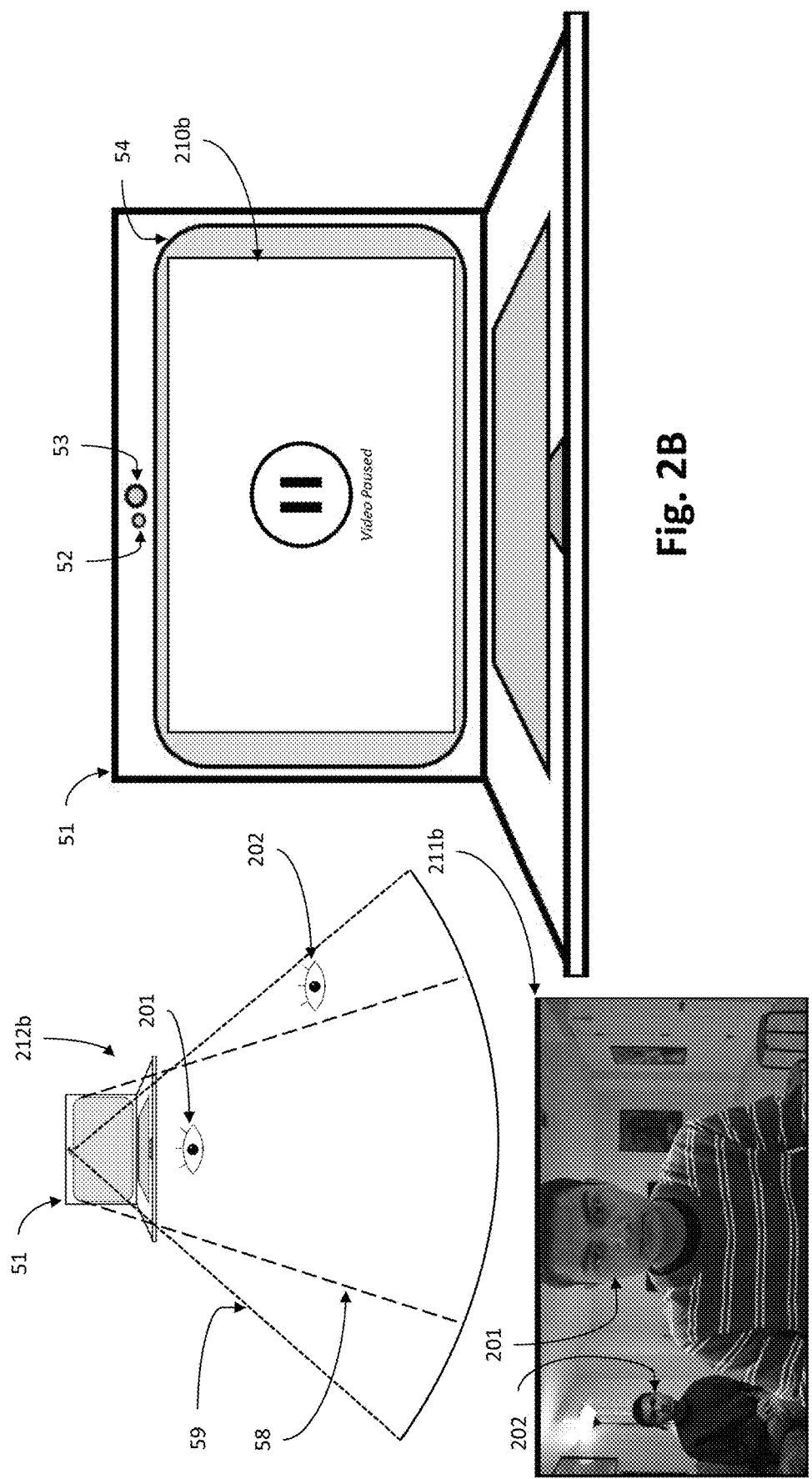
Figure 2C:
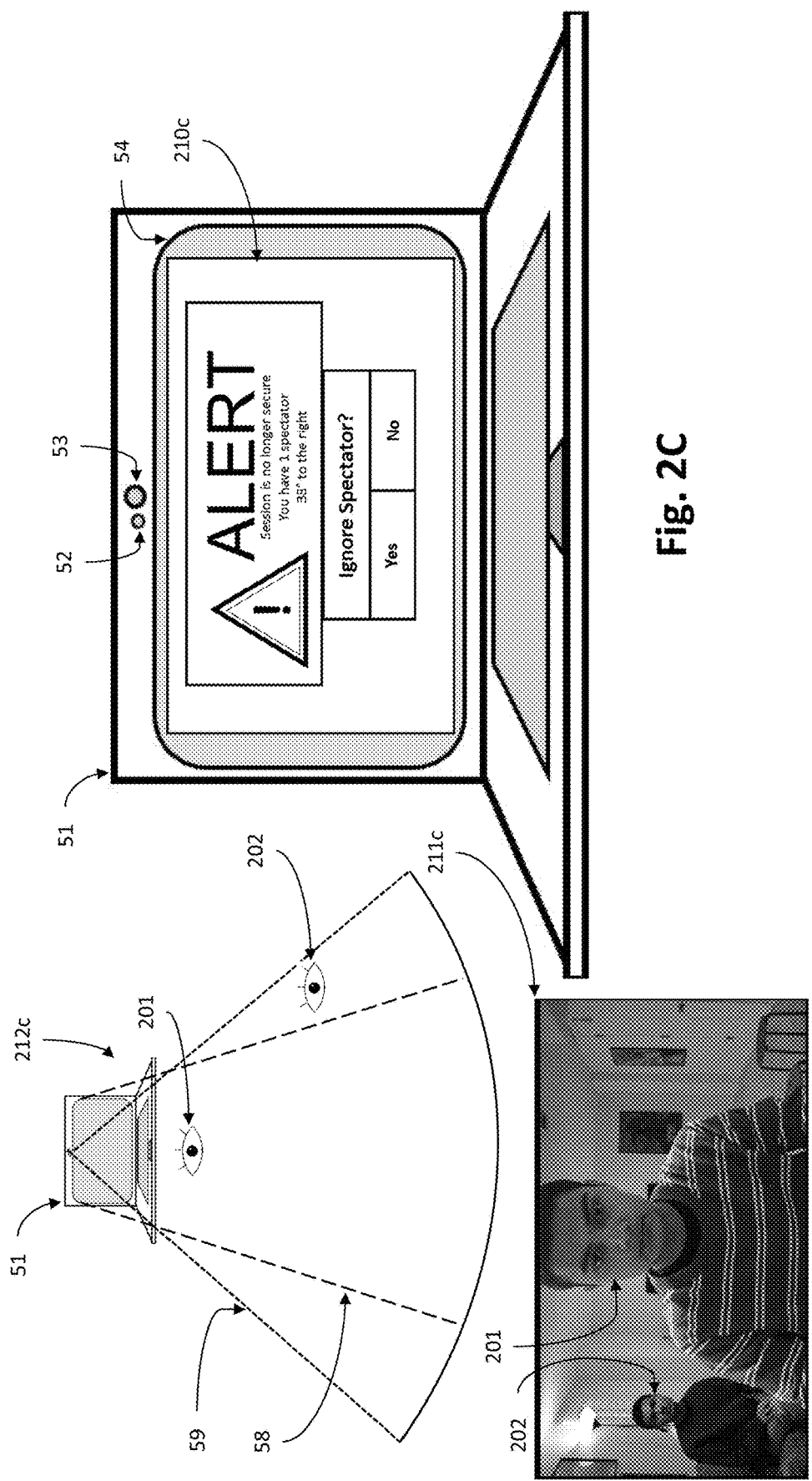
Figure 2D:
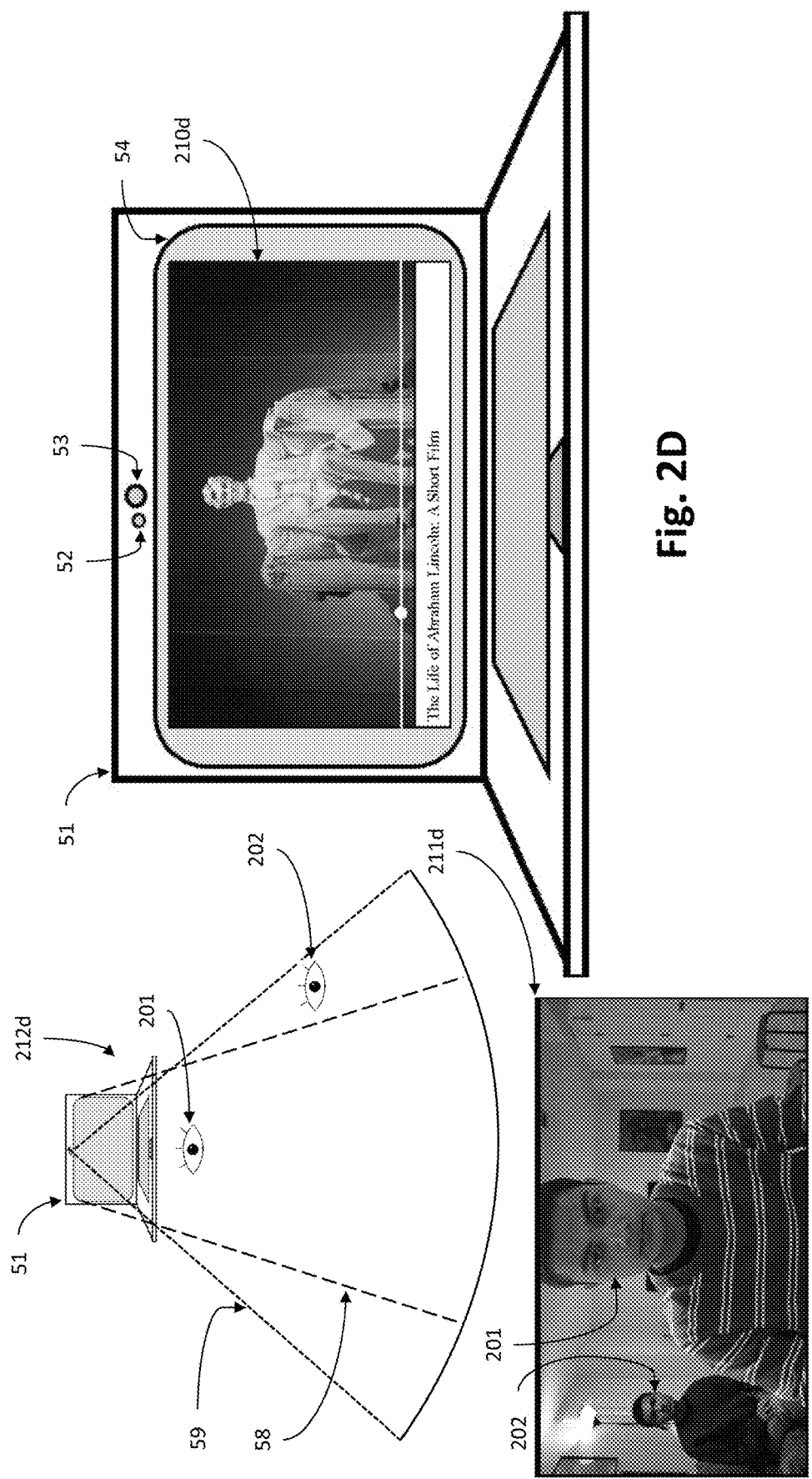

FIG. 2A illustrates the first scene of the scenario in which the spectator 202 is not within the ranges of the IR camera's FOV (field of view) 59 or the viewing angle of the device's display 58 and is therefore not detected by the IR camera 52 and poses no threat to the privacy of primary user 201.

FIG. 2B illustrates the second scene of the scenario in which the spectator 202 has moved into the range of the IR camera's FOV (field of view) 59 but not yet into the range of the display's viewing angle 58. Spectator 202 is also attempting to look at user 201's content as is detected by IR camera 59. Seeing as how in this scene the privacy of user 201 is potentially threatened if spectator 202 chooses to move closer within the viewing range of the display 58, the system pauses the video which was playing in the previous scene 210b in order to prevent the spectator 202 from viewing the content.

FIG. 2C illustrates the third scene of the scenario in which the spectator 202 is within range of the IR camera's FOV (field of view) 59 but not yet in range of the display's viewing angle 58. Spectator 202 is also attempting to look at user 201's content as is detected by IR camera 59. After the content is modified/censored in the previous scene, the user 201 is alerted of the presence of the spectator and is prompted by the system to ignore the spectator 202 and thus include the spectator as a user instead of hiding the content being displayed from them. Should the user 201 choose to ignore the spectator 202, the modification/censorship of the content will cease. Should the user 201 continue acknowledging the spectator 202, modification/censorship will continue until either the spectator walks out of both ranges 58 and 59 or the user 201 decides to securely toggle off the system and end the private session.

FIG. 2D illustrates the fourth scene of the scenario in which the spectator 202 is within range of the IR camera's FOV (field of view) 59 but not yet in range of the display's viewing angle 58. However, in this scene spectator 202 has been acknowledged by the user 201 and spectator 202 has been allowed visibility of the video based content which was being viewed in the first scene 2A. The content is reverted to its original state and the video begins playing 210d with both new users 201 and 202.

FIG. 3A-3E illustrate a scenario in which a primary user 301 has their private browsing session interrupted by a two spectators 202 and 203. The private browsing session is being facilitated via the proposed technology/system running on an imagined smartphone 61 or otherwise capable device. A device capable of implementing the proposed technology/system must have an integrated display 64 fitted with a privacy screen/filter which significantly restricts the viewing angles of the display, IR (infrared) or near IR camera 62 in the same direction as the display (front facing) and preferably another normal camera 63 in the same direction as the display (front facing). Within the scenario the singular user 301 is browsing text and image based content while being situated directly in front of their device.

Figure 3A:
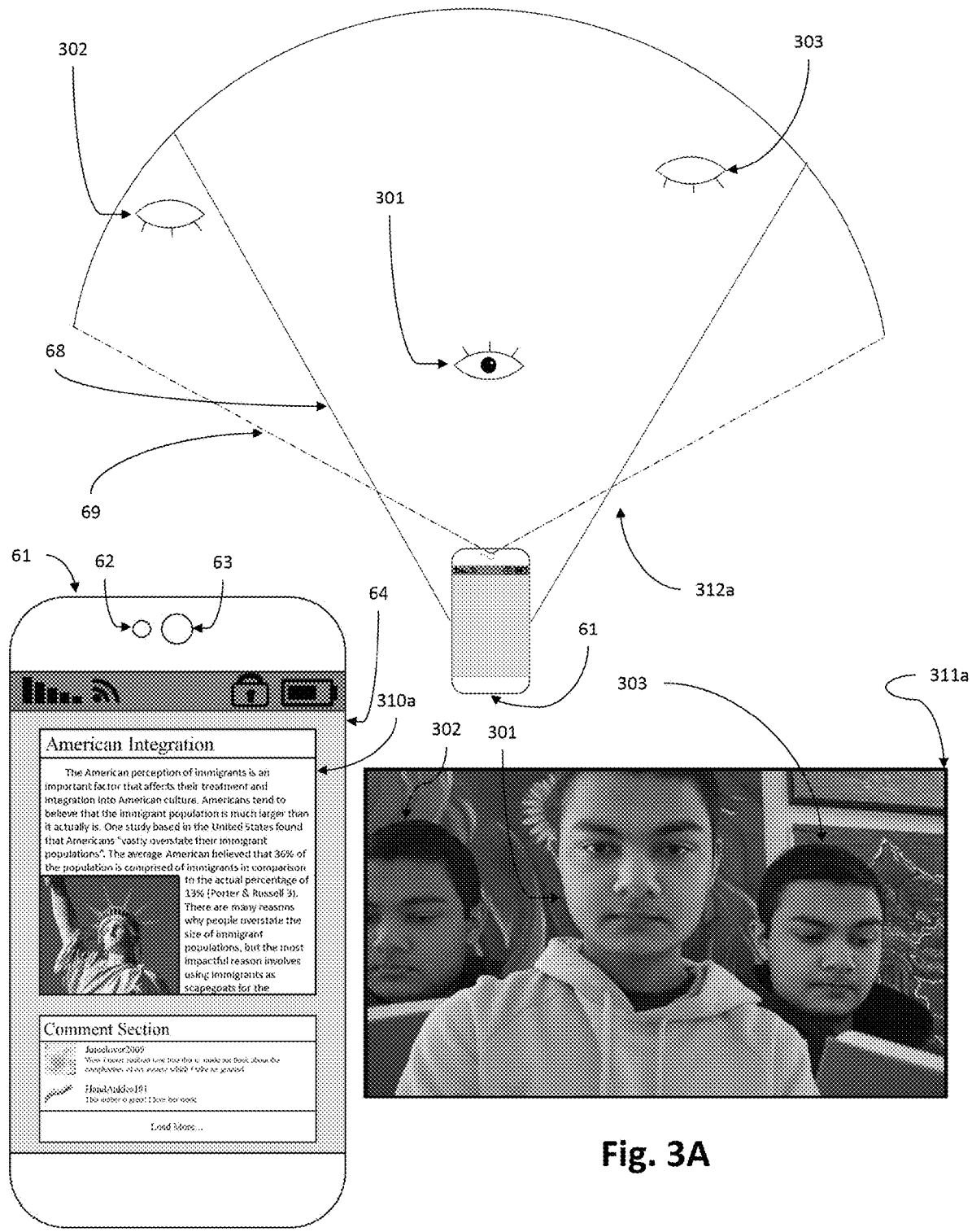
FIG. 3A-FIG. 3E show an exemplary scenario in which a user viewing an article on their smart device has their privacy threatened by a single spectator.
Figure 3B:
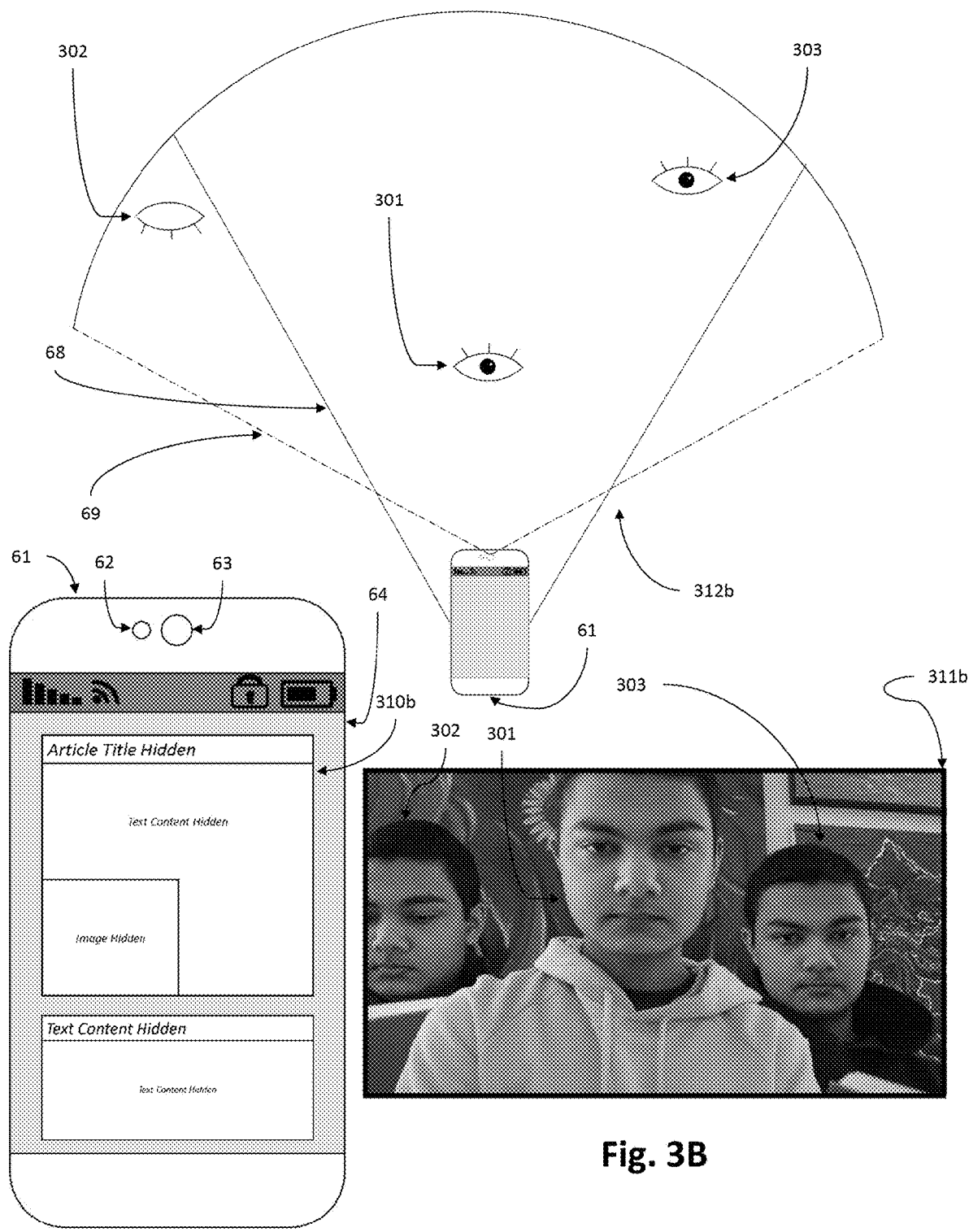

FIG. 3A illustrates the first scene of the scenario in which two spectators 302 and 303 are within the ranges of the IR camera's FOV (field of view) 69 and spectator 303 is within the viewing angle of the device's display 68 as well. However, in the first scene of the scenario neither spectator is acknowledged as a threat to privacy as neither spectator is looking towards the device's display 64 which would be detected by IR camera 62 in the camera view 311a.

FIG. 3B illustrates the second scene of the scenario in which two spectators 302 and 303 are within the ranges of the 1R camera's FOV (field of view) 69 and spectator 303 is within the viewing angle of the device's display 68 as well. However, spectator 303 has begun looking at the display 64 as detected by IR camera 62 and the system has begun censoring the content 310*b* from user 301 and 303. Since spectator 303 has clear visibility of the display, the system immediately begins censoring the content as opposed to modifying the content 310*b*.

Figure 3C:
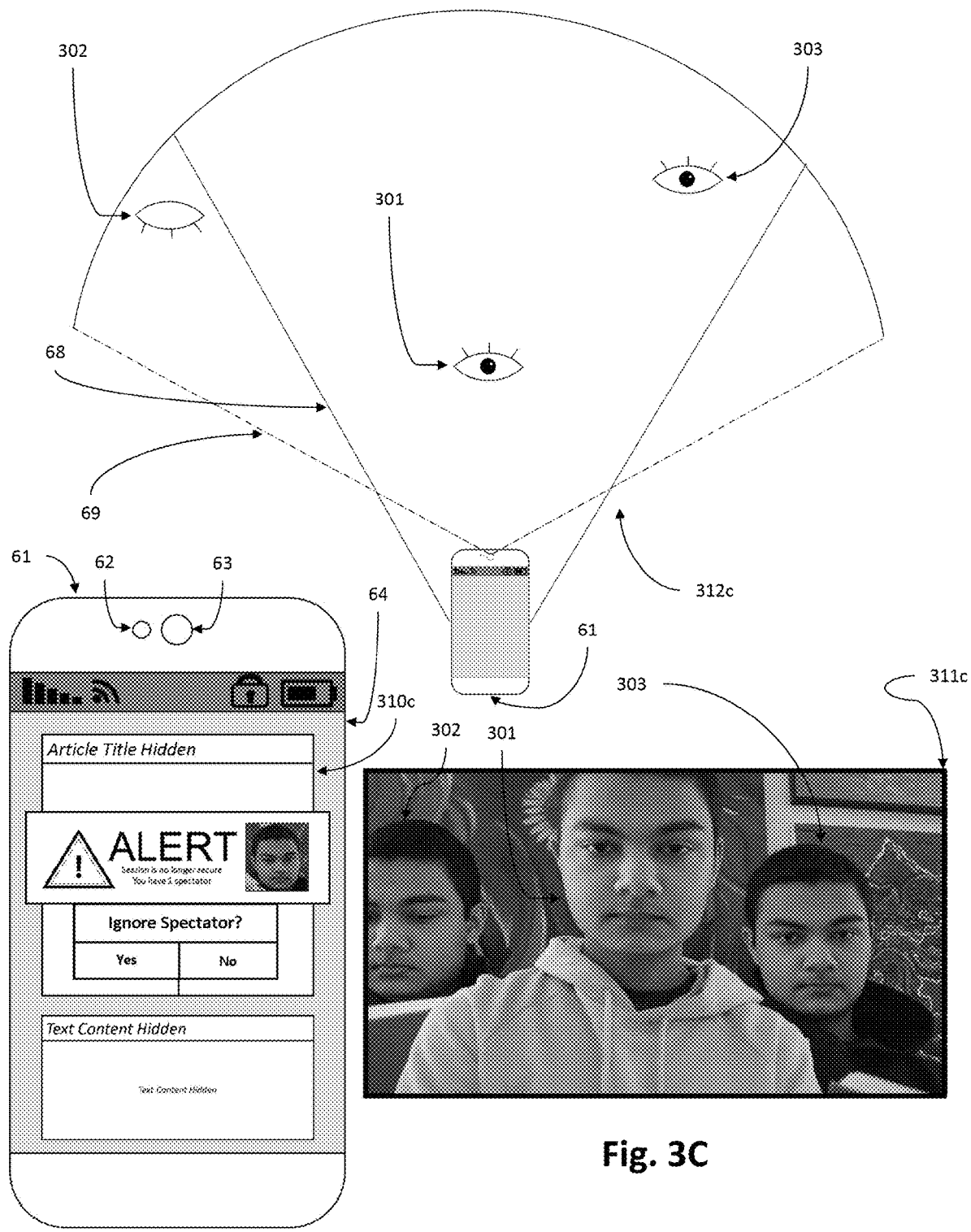
Figure 3D:
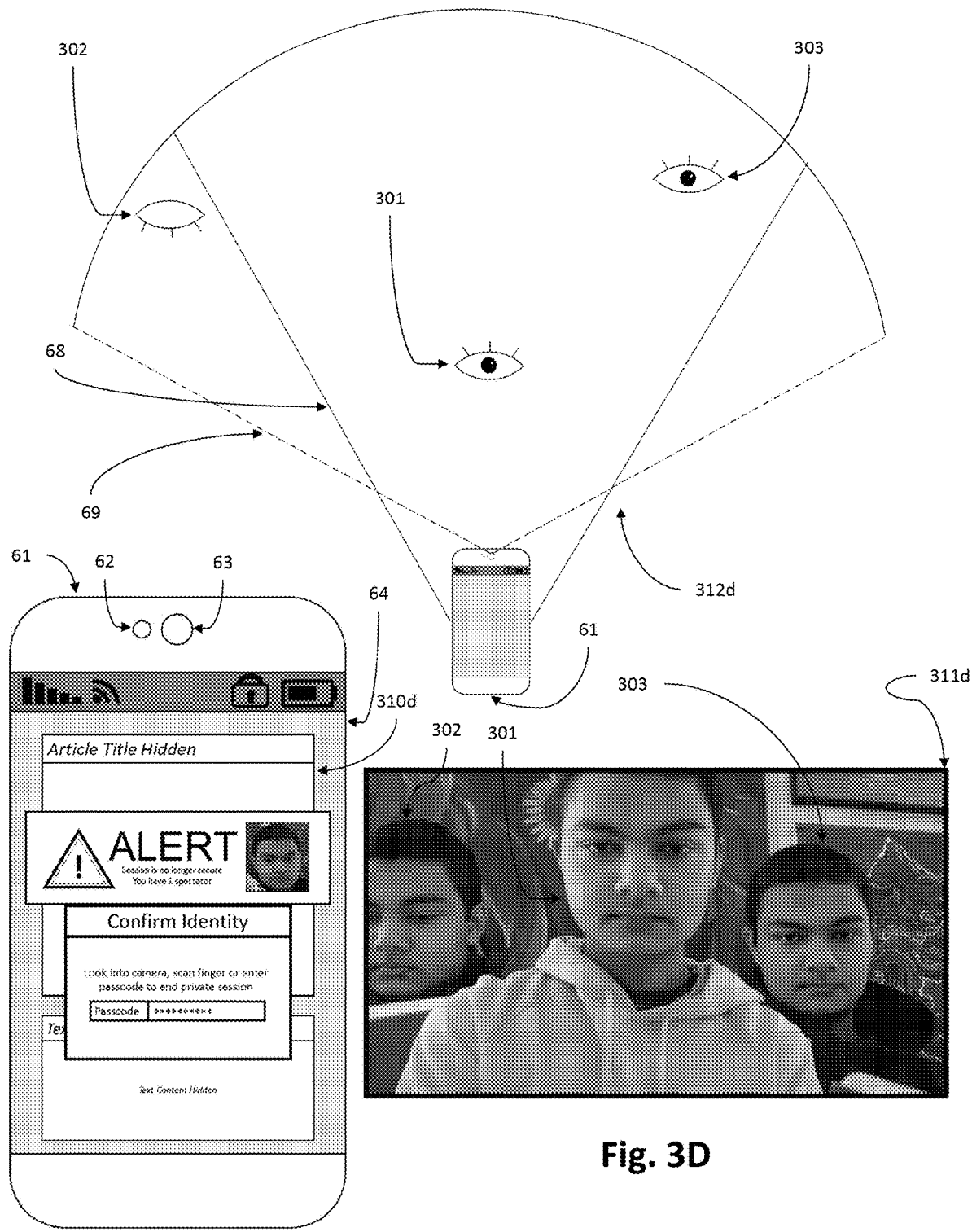
Figure 3E:
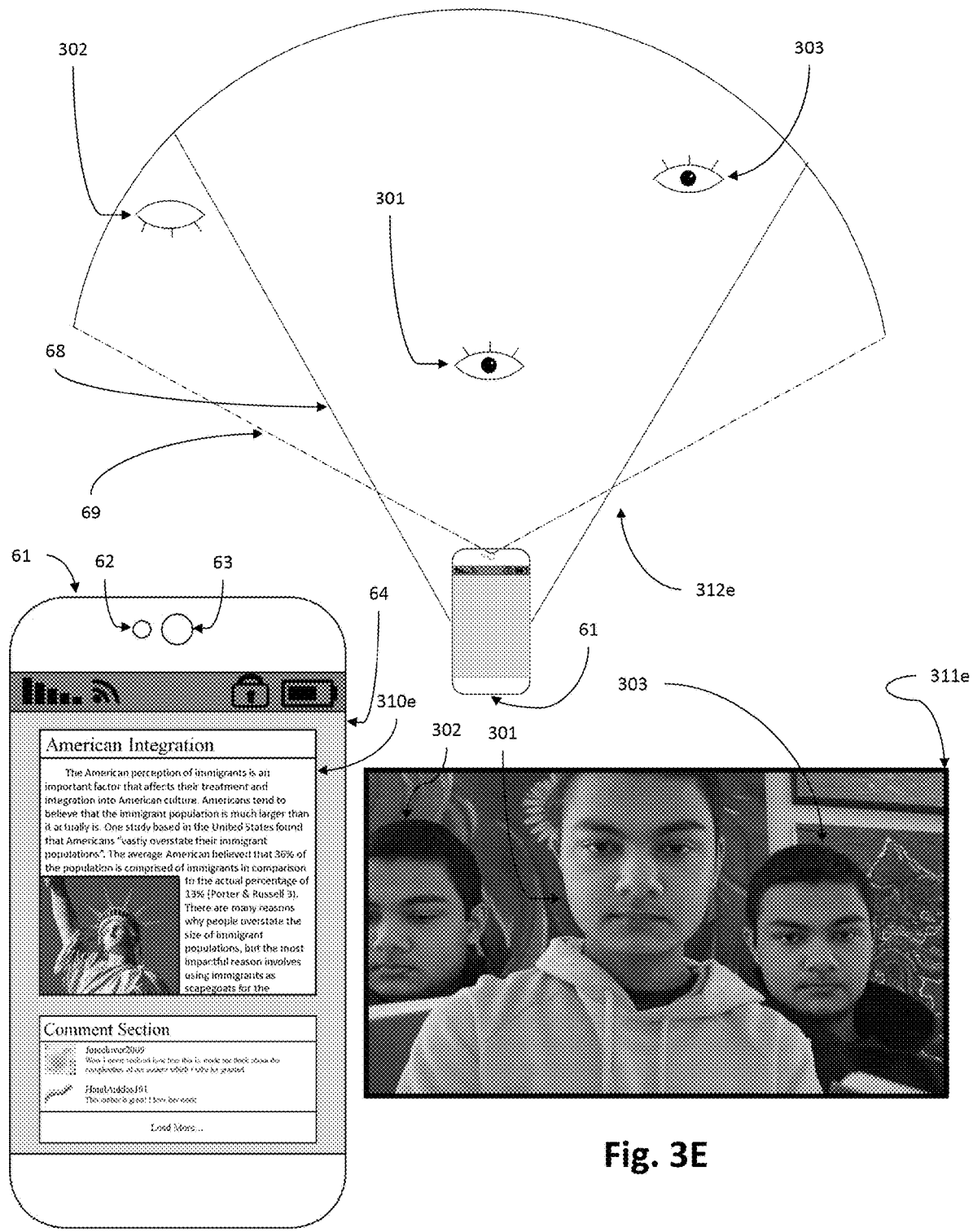

FIG. 3C illustrates the third scene of the scenario in which two spectators 302 and 303 are within the ranges of the IR camera's FOV (field of view) 69 and spectator 303 is within the viewing angle of the device's display 68 as well. In this scene the system has alerted the user 301 of spectator 303 who is attempting to view the content displayed 310*c*. Using the front facing camera of the imagined smartphone device 61, the system takes a picture of the spectator 303 and then displays their face within the alert banner to show the user 301 exactly who is looking at their display 64. The user is also prompted by the system to ignore the spectator 303 and thus include the spectator as a user instead of hiding the content being displayed from them. Should the user 301 choose to ignore the spectator 303, the modification/censorship of the content will cease. Should the user 301 continue acknowledging the spectator 203, modification/censorship will continue until either the spectator walks out of both ranges 68 and 69 or the user 301 decides to securely toggle off the system and end the private session.

FIG. 3D illustrates the fourth scene of the scenario in which two spectators 302 and 303 are within the ranges of the IR camera's FOV (field of view) 69 and spectator 303 is within the viewing angle of the device's display 68 as well. In this scene the user 301 chooses to end their private browsing session and disable the system effectively giving the spectator 303 visibility of the content displayed 310*d*. In order to confirm that the individual who is ending the private session is a primary user, the system request identity confirmation in the form of a key phrase/passcode. Otherwise it would be possible for spectator 303 or 302 to disable the private browsing session when/if the user 301 temporarily leaves their device.

FIG. 3E illustrates the fifth scene of the scenario in which two spectators 302 and 303 are within the ranges of the IR camera's FOV (field of view) 69 and spectator 303 is within the viewing angle of the device's display 68 as well. After the system is disabled, censorship of the content 310*e* has ceased and the content is latent to both individuals 301 and 303. Spectator 302 however still lacks visibility of the display because they are not within the ranges of displays viewing angle 68, the privacy filter/screen prevents them from seeing the screen in addition to the fact that they are not looking towards the display to begin with as is apparent in camera view 311*e*.

FIG. 4A-4E illustrate a scenario in which a primary user 401 (who is wearing a striped sweater) has their private browsing session interrupted by a two spectators 402 and 403 (who is wearing a solid sweater). The private browsing session is being facilitated via the proposed technology/system running on an imagined laptop 51 or otherwise capable device. A device capable of implementing the proposed technology/system must have an integrated display 54 fitted with a privacy screen/filter which significantly restricts the viewing angles of the display, IR (infrared) or near IR camera 52 in the same direction as the display (front facing) and preferably another normal camera 53 in the same direction as the display (front facing). Within the scenario the singular user 401 is browsing text based content while being situated directly in front of their device.

Figure 4A:
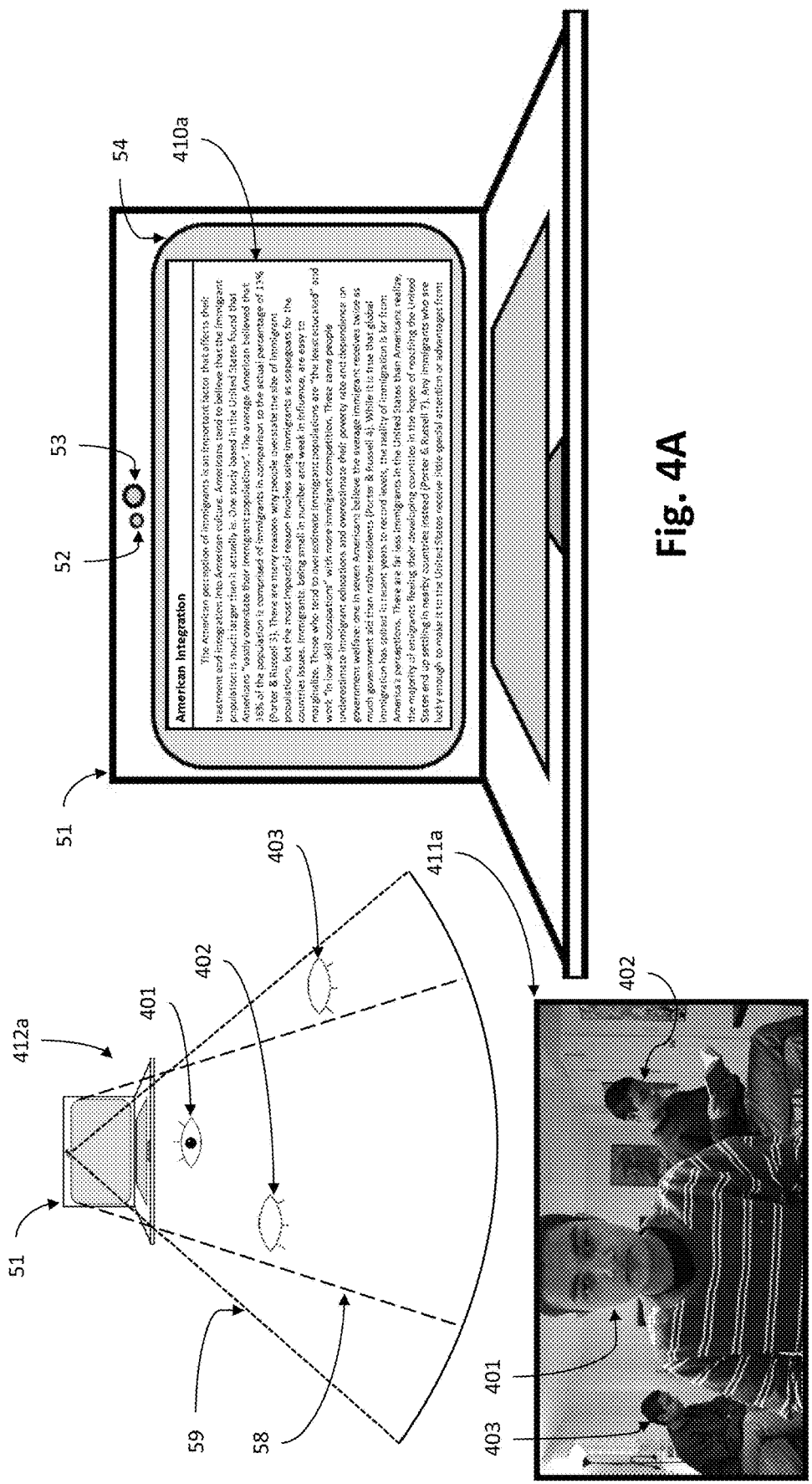
FIG. 4A-FIG. 4E show an exemplary scenario in which a user viewing text on their laptop has their privacy threatened by a multiple simultaneous spectators.
Figure 4B:
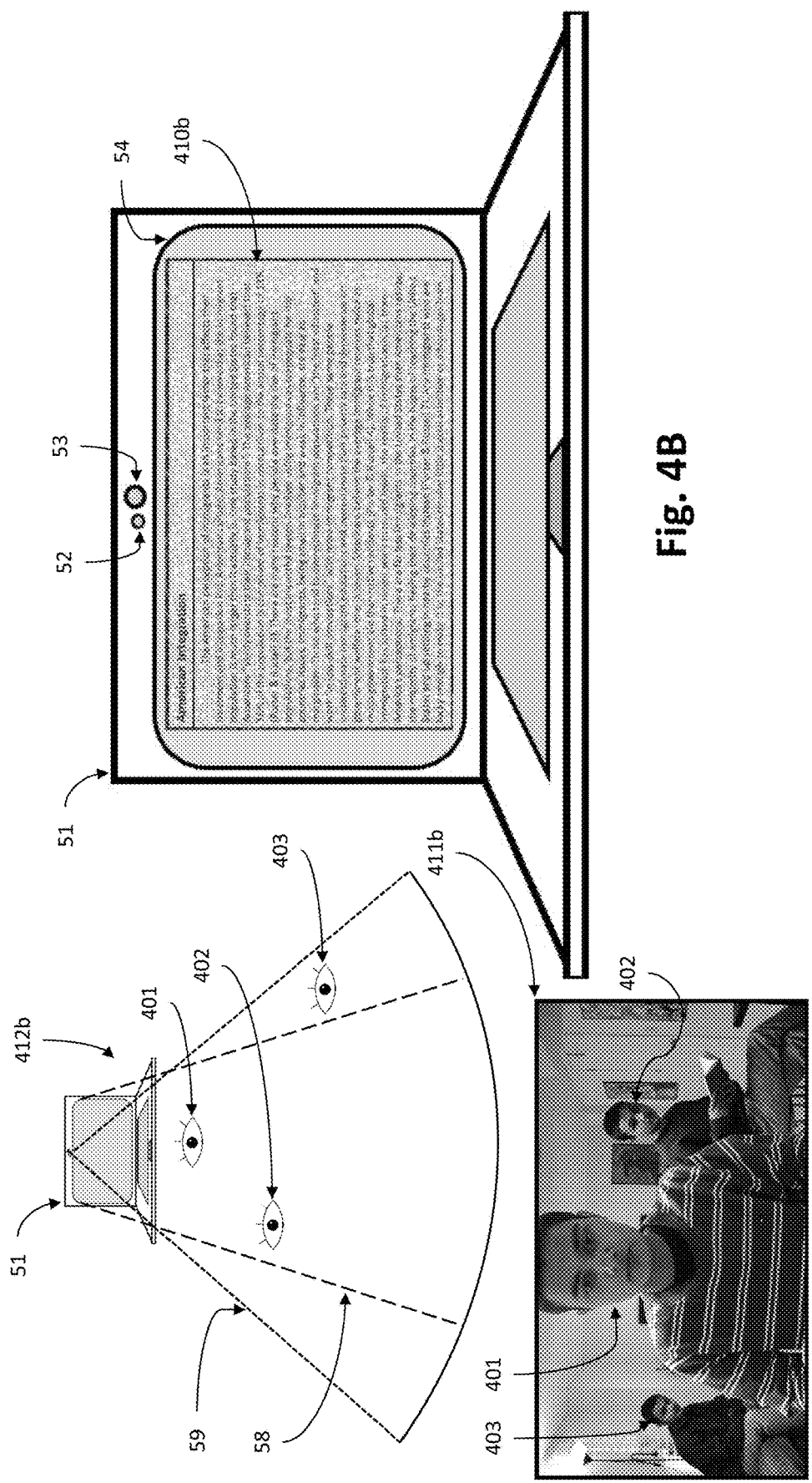

FIG. 4A illustrates the first scene of the scenario in which two spectators 402 and 403 are within the ranges of the IR camera's FOV (field of view) 69 and spectator 402 is within the viewing angle of the device's display 68 as well. However, in the first scene of the scenario neither spectator is acknowledged as a threat to privacy as neither spectator is looking towards the device's display 54 which would be detected by IR camera 52 in the camera view 411*a*.

FIG. 4B illustrates the second scene of the scenario in which two spectators 402 and 403 are within the ranges of the IR camera's FOV (field of view) 69 and spectator 402 is within the viewing angle of the device's display 68 as well. In this scene, both spectators 402 and 403 have begun looking towards the device's display 54 in attempt to view the content displayed 410*b*. The system, after detecting the change in the spectator's presence, modifies the content 410*b* such that it has a wavy colored pattern over it which makes it difficult for spectators 402 and 403 to successfully read the text based content from a distance.

Figure 4C:
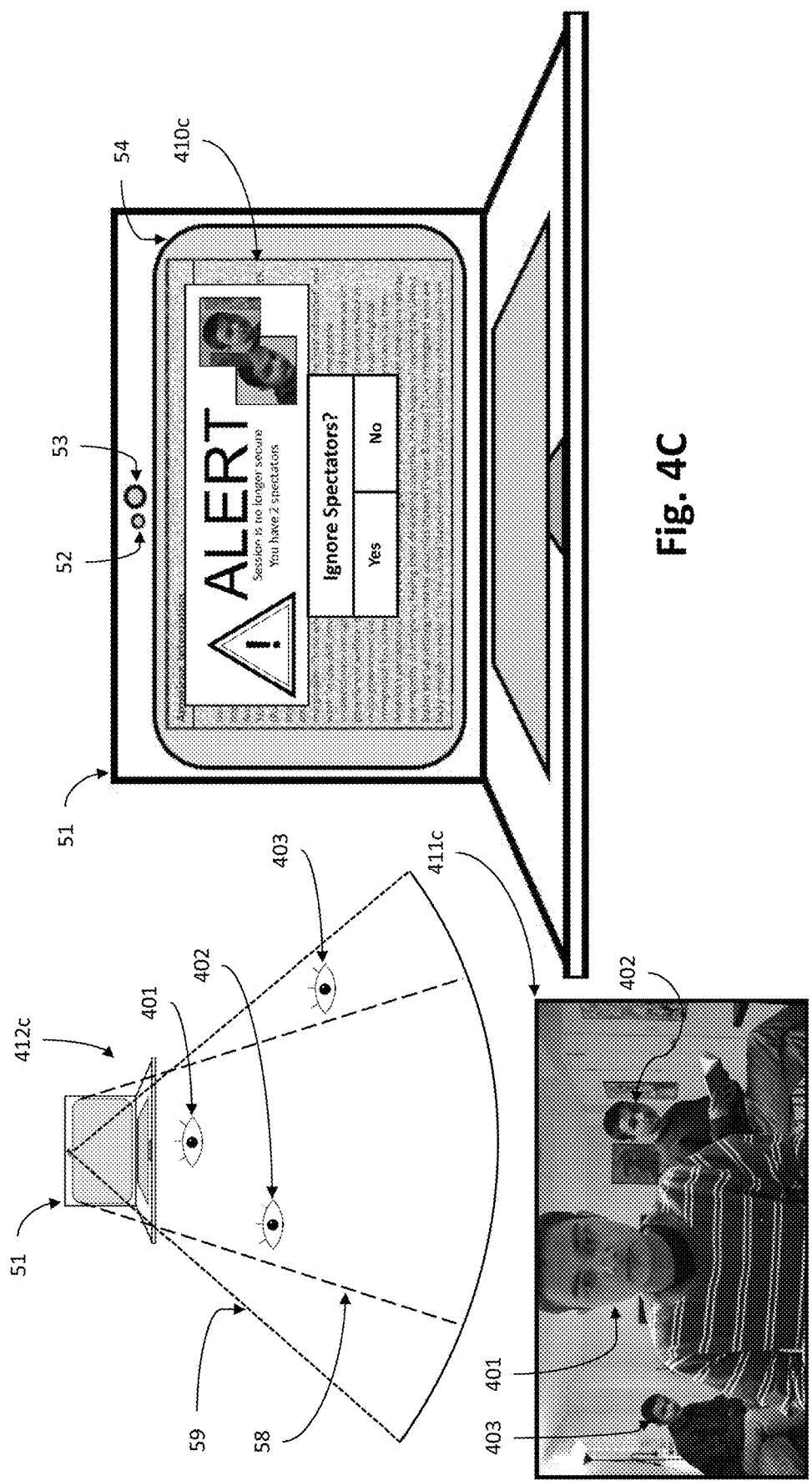
Figure 4D:
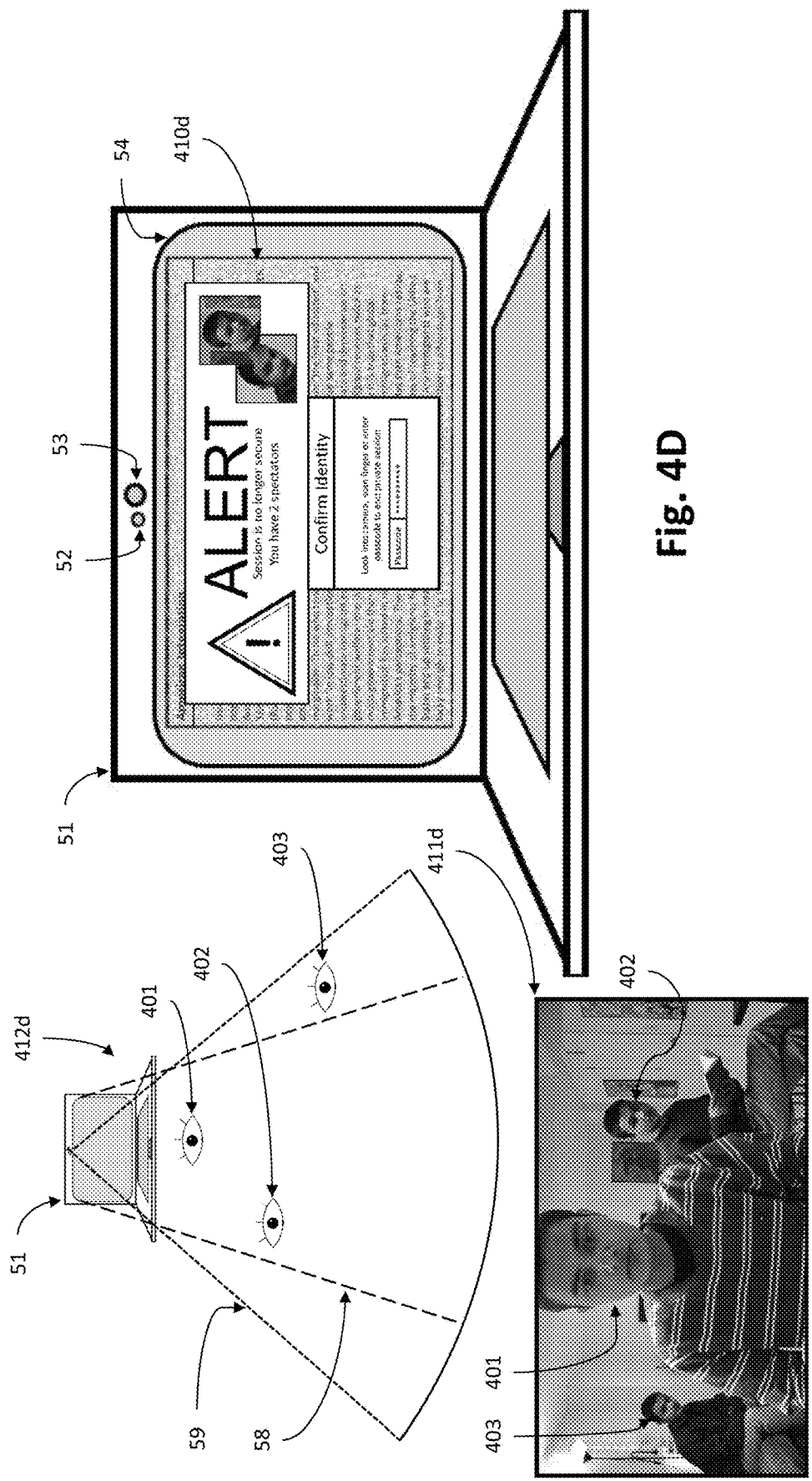
Figure 4E:
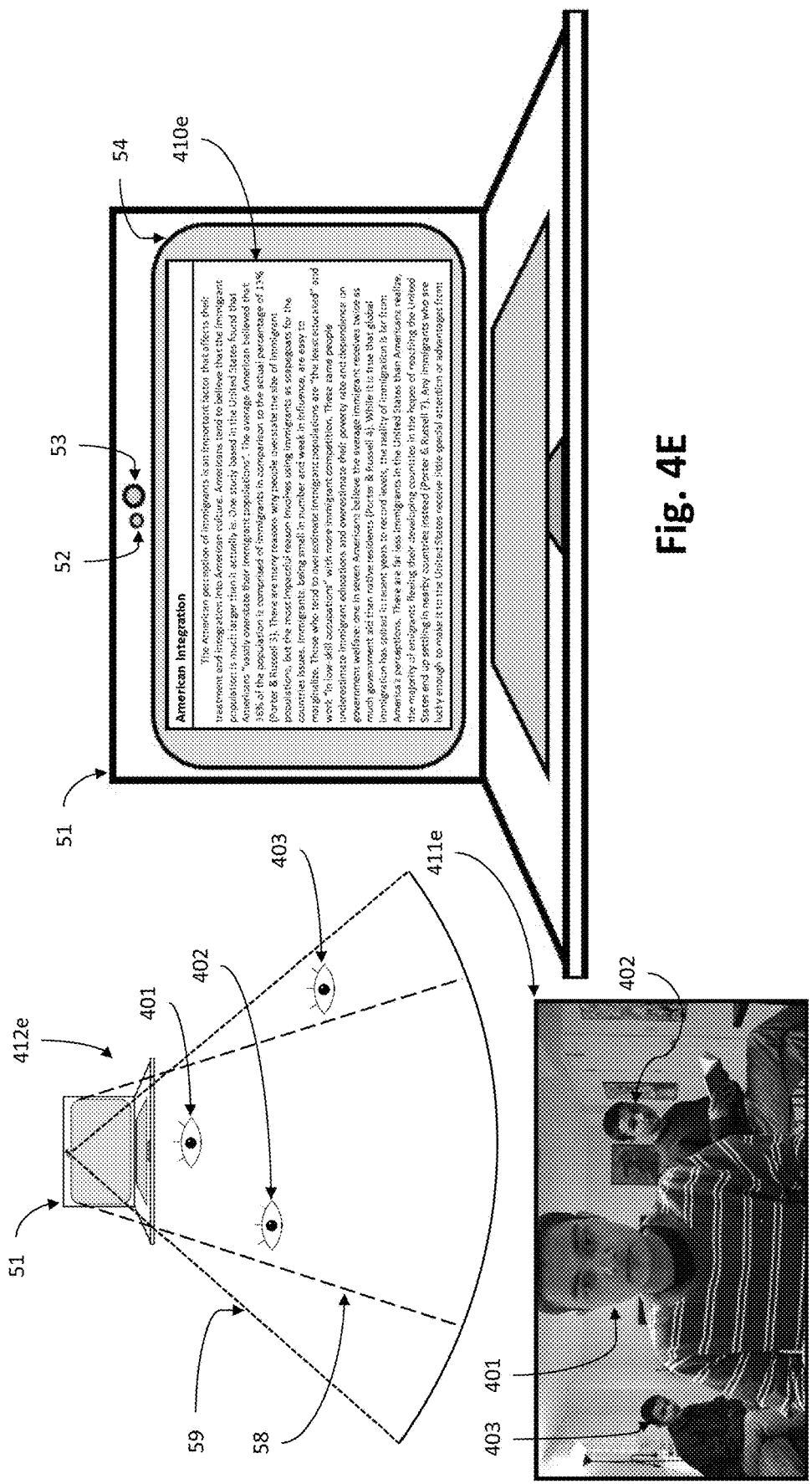

FIG. 4C illustrates the third scene of the scenario in which two spectators 402 and 403 are within the ranges of the IR camera's FOV (field of view) 69 and spectator 402 is within the viewing angle of the device's display 68 as well. In this scene the system has alerted the user 401 of spectators 402 and 403 who is attempting to view the content displayed 410*c*. Using the front facing camera of the imagined laptop device 51, the system takes a picture of the spectators 402 and 403 and then displays their faces within the alert banner to show the user 401 exactly who is looking at their display 54. The user is also prompted by the system to ignore the spectators 402 and 403 and thus include the spectators as users instead of hiding the content being displayed from them. Should the user 401 choose to ignore the spectators 402 and 403, the modification/censorship of the content will cease. Should the user 401 continue acknowledging the spectators 402 and 403, modification/censorship will continue until either the spectators walk out of both ranges 58 and 59 or the user 401 decides to securely toggle off the system and end the private session.

FIG. 4D illustrates the fourth scene of the scenario in which two spectators 402 and 403 are within the ranges of the IR camera's FOV (field of view) 69 and spectator 402 is within the viewing angle of the device's display 68 as well. In this scene the user 401 chooses to end their private browsing session and disable the system effectively giving the spectator 402 visibility of the content displayed 410*d*. In order to confirm that the individual who is ending the private session is a primary user, the system request identity confirmation in the form of a key phrase/passcode. Otherwise it would be possible for spectator 403 or 402 to disable the private browsing session when/if the user 401 temporarily leaves their device.

FIG. 4E illustrates the fifth scene of the scenario in which two spectators 402 and 403 are within the ranges of the IR camera's FOV (field of view) 59 and spectator 402 is within the viewing angle of the device's display 58 as well. After the system is disabled, censorship of the content 410*e* has ceased and the content is latent to both individuals 401 and 402. Spectator 403 however still lacks visibility of the display because they are not within the ranges of displays viewing angle 58, the privacy filter/screen prevents them from seeing the screen in addition to the fact that they are not looking towards the display to begin with as is apparent in camera view 411*e*.

FIG. 5A-5H illustrate a scenario in which a primary user 501 (who is wearing a striped sweater) has their private browsing session interrupted by a spectator 502 (who is wearing a solid sweater). The private browsing session is being facilitated via the proposed technology/system running on an imagined laptop 51 or otherwise capable device. A device capable of implementing the proposed technology/system must have an integrated display 54 fitted with a privacy screen/filter which significantly restricts the viewing angles of the display, IR (infrared) or near IR camera 52 in the same direction as the display (front facing) and preferably another normal camera 53 in the same direction as the display (front facing). Within the scenario the singular user 401 is browsing text based content while being situated directly in front of their device.

Figure 5A:
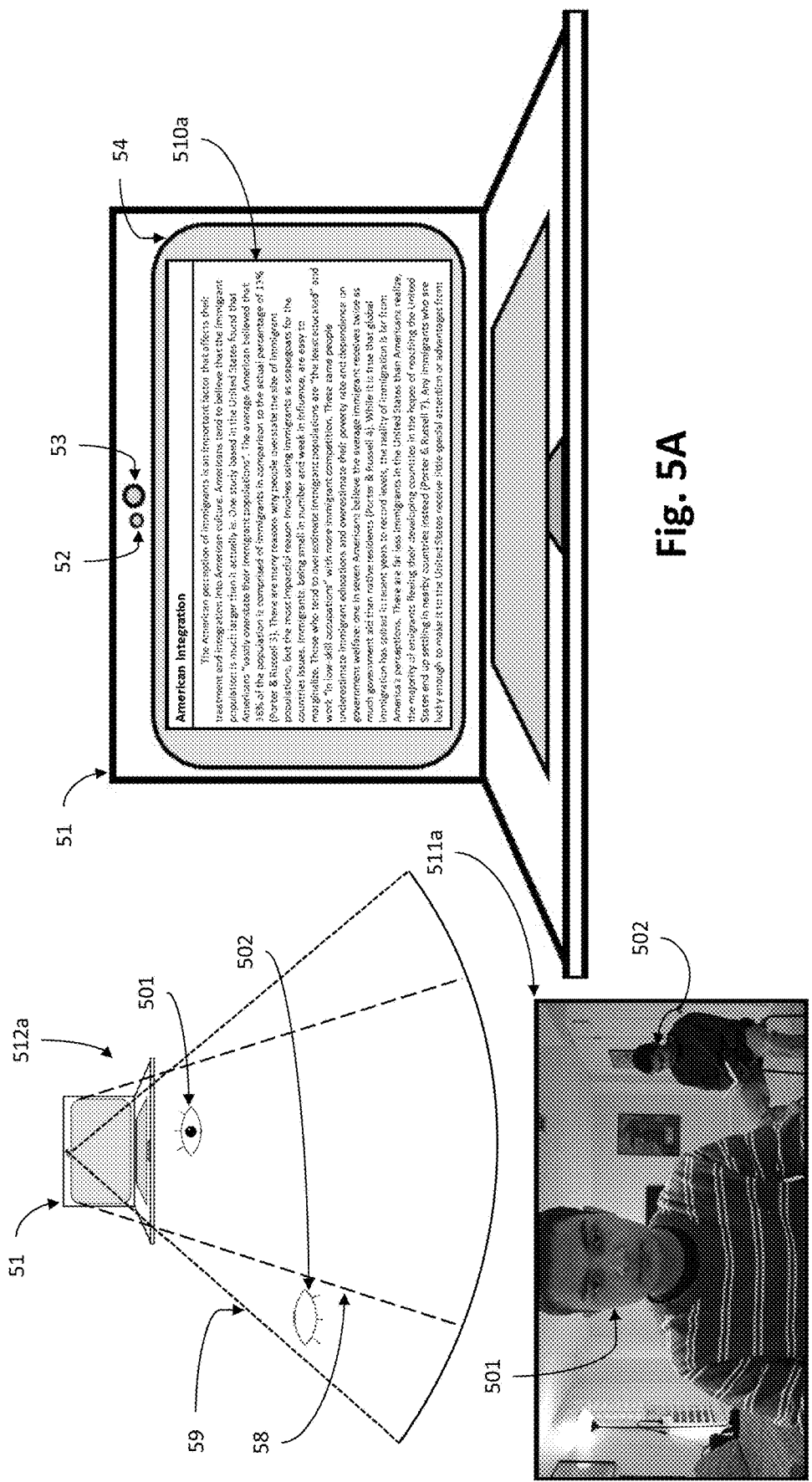
Figure 5B:
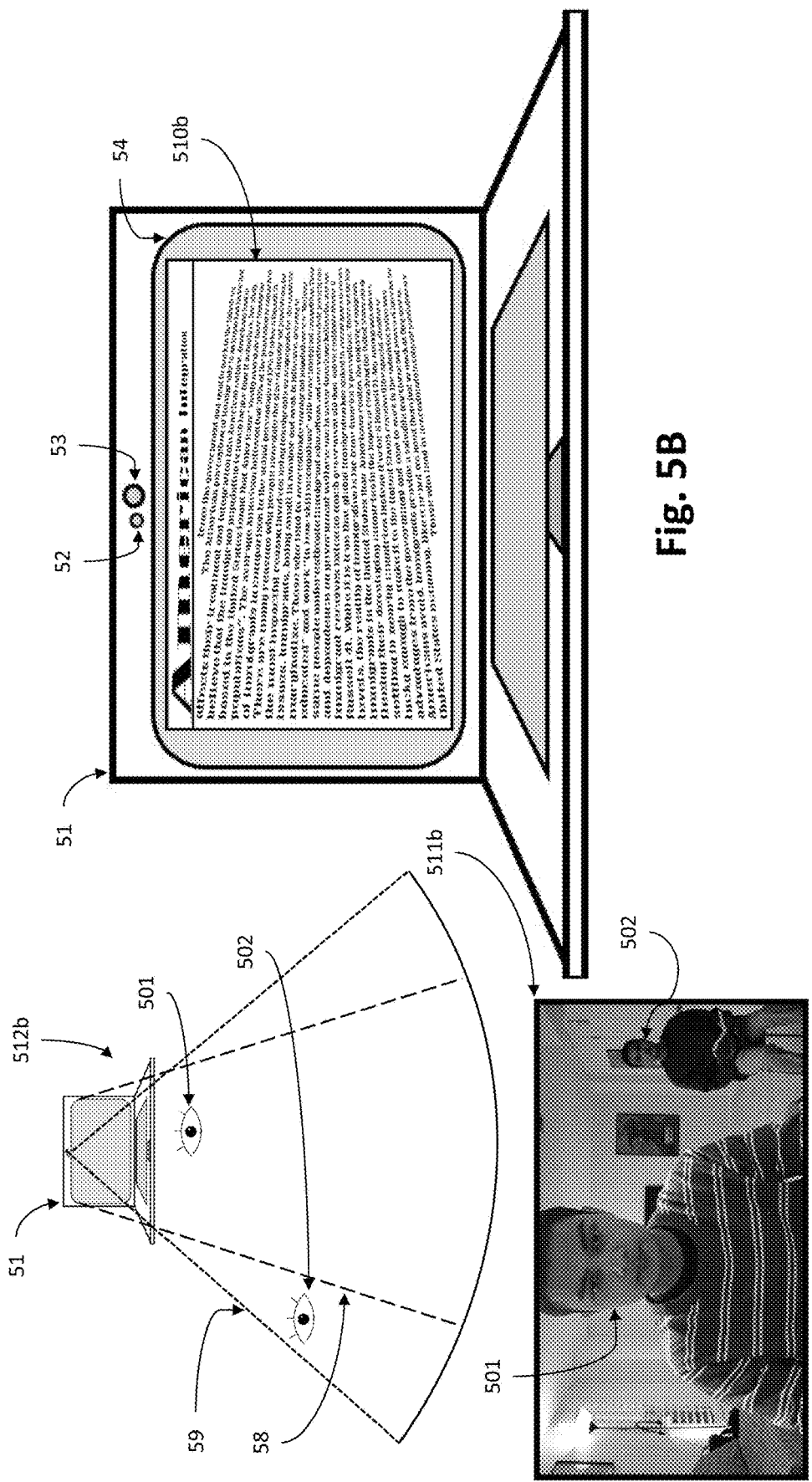

FIG. 5A illustrates the first scene of the scenario in which the spectator 502 is within the ranges of the IR camera's FOV (field of view) 59 but not within the viewing angle of the device's display 58. The spectator 502 is not looking toward display 54 as detected in the camera view 511a and is therefore not considered a threat to the privacy of user 501.

FIG. 5B illustrates the second scene of the scenario in which the spectator 502 is within the ranges of the IR camera's FOV (field of view) 59 but not within the viewing angle of the device's display 58. In this scene the spectator 502 begins looking towards the display 54 as detected in the camera view 511b. Seeing as how the spectator 502 is not within the viewing angles of the display 58, the system prefers to modify the content as opposed to total censorship. In order to modify the text based content such that user 501 still can continue browsing, the font of the text is altered and tilted away from the direction of the potential threat 502. The modified content 510b is legible when viewed head-on and from the right at a close distance, but is difficult to decipher when viewed from the left at a distance. The system used data about the user's presence and the content being consumed in order to effectively modify the content displayed 510b to deter spectator 502 before they gain clear visibility of the content.

Figure 5C:
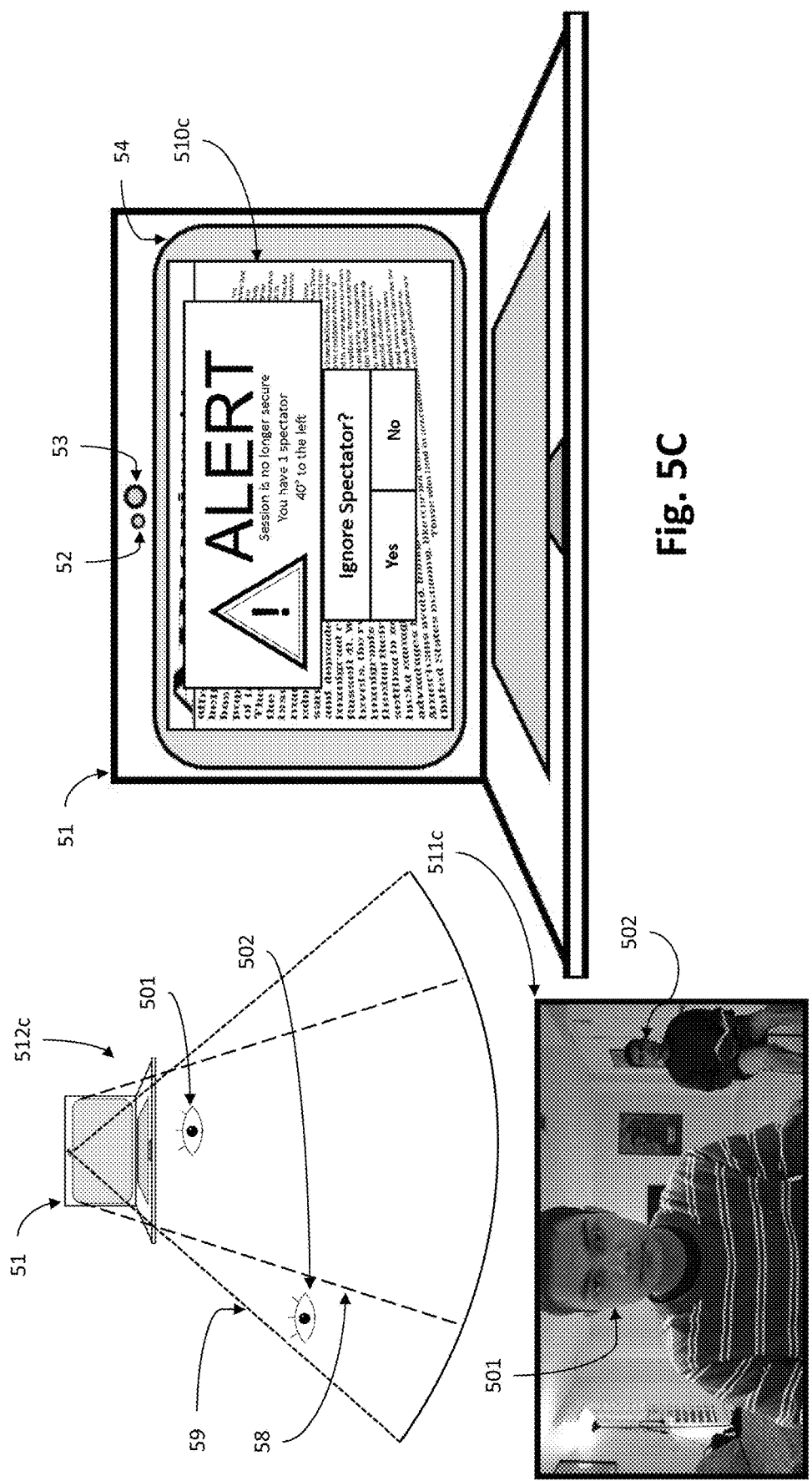

FIG. 5C illustrates the third scene of the scenario in which the spectator 502 is within the ranges of the IR camera's FOV (field of view) 59 but not within the viewing angle of the device's display 58. The system alerts user 501 of the presence of spectator 502 and then prompts the user 501 to ignore spectator 502. Should the user 501 choose to ignore the spectator 502 the modification/censorship of the content will cease. Should the user 501 continue acknowledging the spectators 502, modification/censorship will continue until either the spectators walk out of both ranges 58 and 59 or the user 501 decides to securely toggle off the system and end the private session.

Figure 5D:
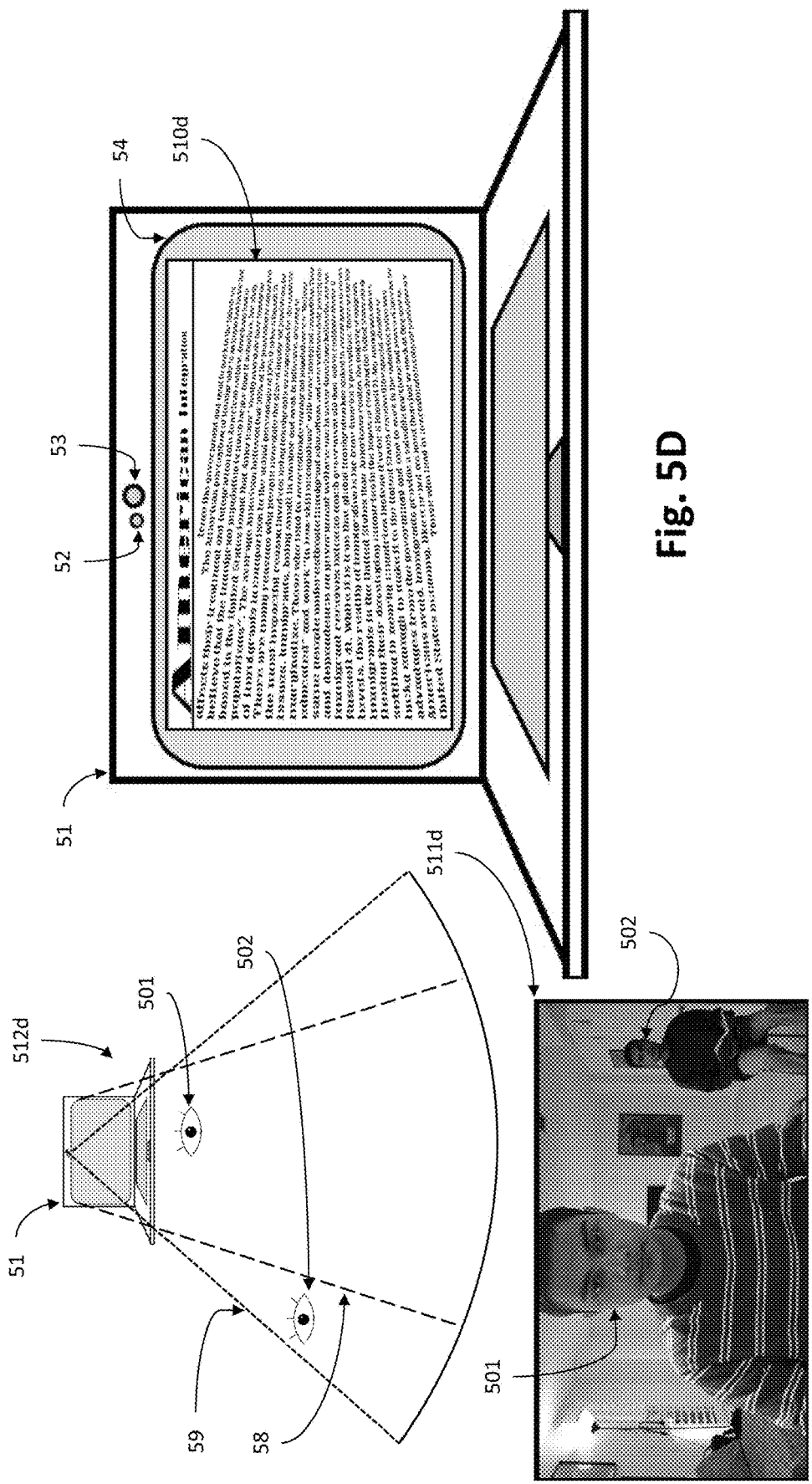

FIG. 5D illustrates the fourth scene of the scenario in which the spectator 502 is within the ranges of the IR camera's FOV (field of view) 59 but not within the viewing angle of the device's display 58. The user 501 chooses not to ignore the spectator and continue modifying the content being displayed 510d in order to deter the spectator 502 from looking towards the display 54.

FIG. 5E illustrates the fifth scene of the scenario in which the spectator 502 is within the ranges of the IR camera's FOV (field of view) 59 and within the viewing angle of the device's display 58. In this scene, the spectator 502 decided to move closer towards the device 51 such that they are within the ranges of the device's viewing angles 58 and have visibility of the display. The IR camera 52 can clearly detect a change in the position and viewpoint of the spectator 502 as shown in the camera view 511e. In reaction to the change of the spectator's 502 presence, the system decides to instead censor the content entirely 510e such that there is no chance that the spectator may be able to decipher the modified content.

Figure 5F:
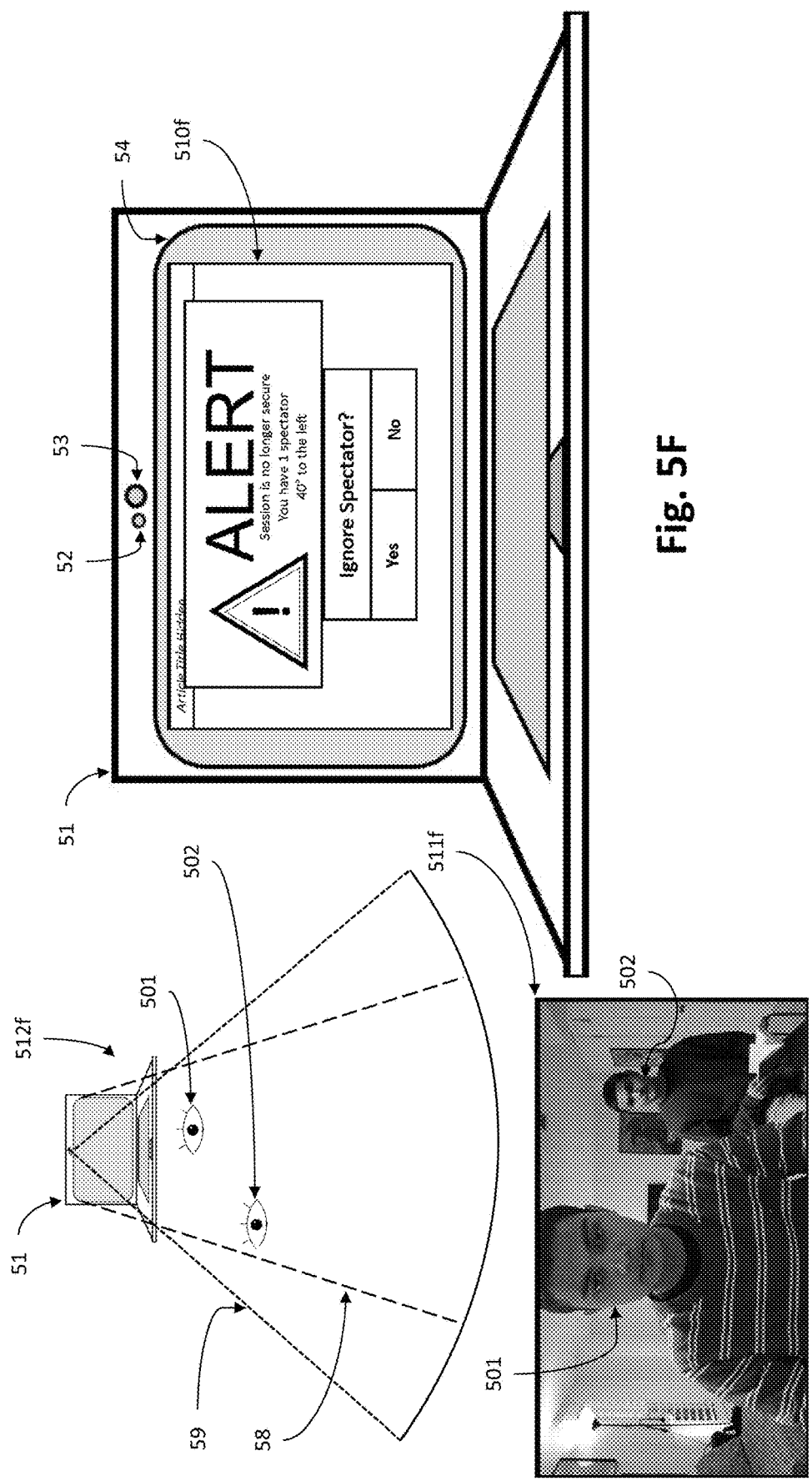

FIG. 5F illustrates the sixth scene of the scenario in which the spectator 502 is within the ranges of the IR camera's FOV (field of view) 59 and within the viewing angle of the device's display 58. The system alerts user 501 of the new presence of spectator 502 and then prompts the user 501 to again ignore spectator 502. Should the user 501 choose to ignore the spectator 502 the modification/censorship of the content will cease. Should the user 501 continue acknowledging the spectators 502, modification/censorship will continue until either the spectators walk out of both ranges 58 and 59 or the user 501 decides to securely toggle off the system and end the private session.

Figure 5G:
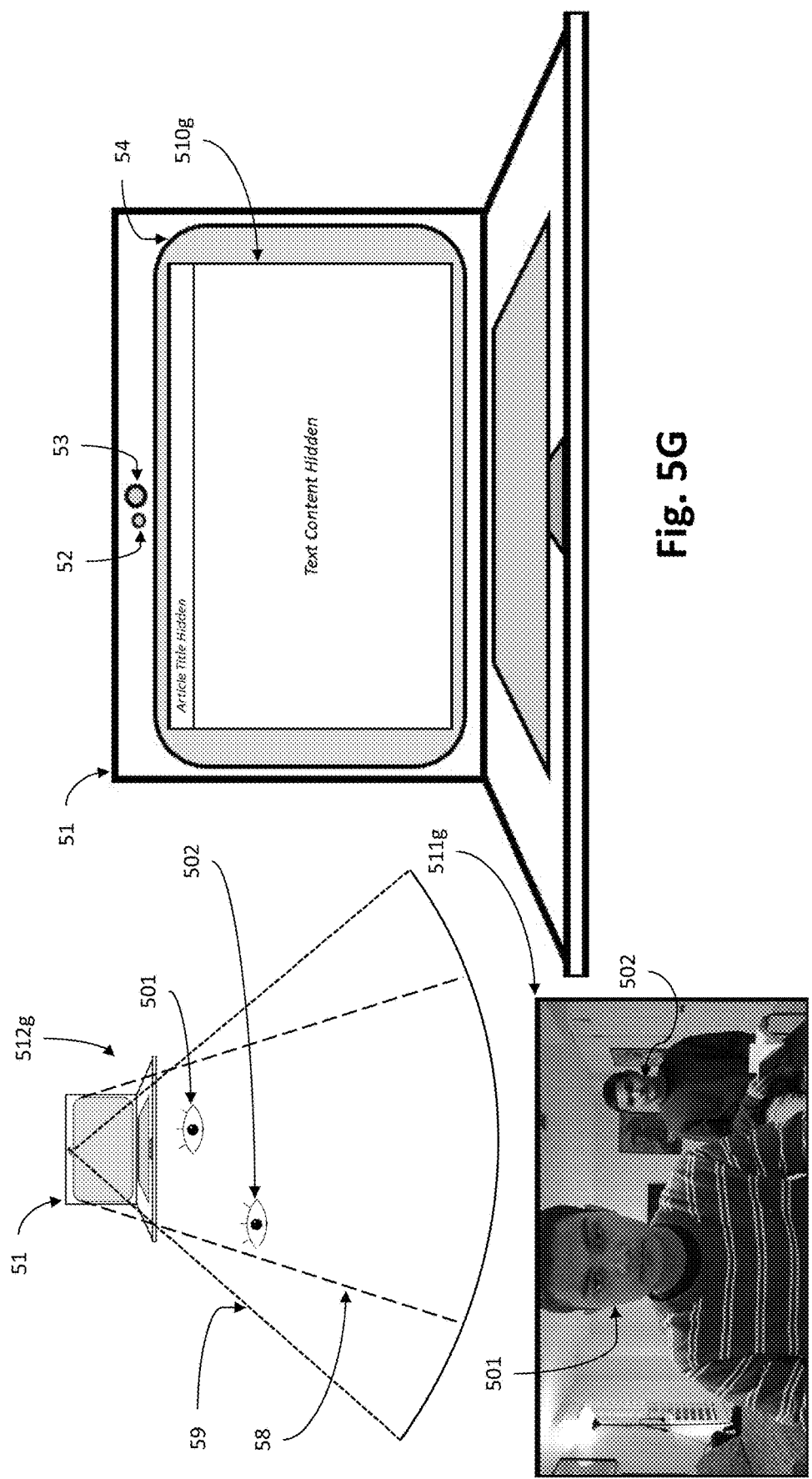

FIG. 5G illustrates the seventh scene of the scenario in which the spectator 502 is within the ranges of the IR camera's FOV (field of view) 59 but not within the viewing angle of the device's display 58. The user 501 again chooses not to ignore the spectator and continue censoring the content being displayed 510g in order to deter the spectator 502.

Figure 5H:
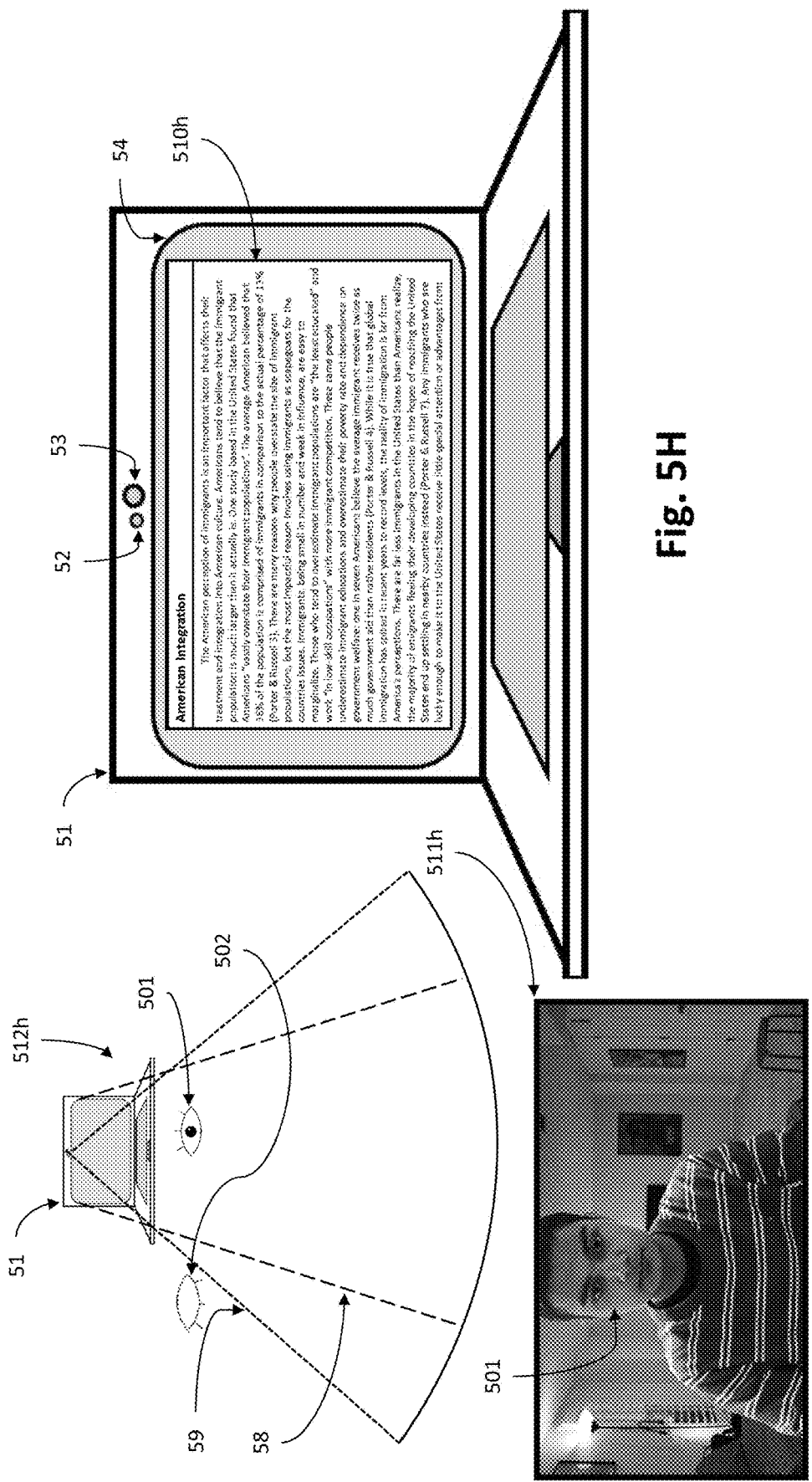

FIG. 5H illustrates the eighth and final scene of the scenario in which the spectator 502 moves out of the ranges of the IR camera's FOV (field of view) 59 and outside the viewing angle of the device's display 58. After the system detects that the spectator is no longer present or looking toward the display within the bounds of the display 58 and the IR camera 59, the content 510h reverts to its original state and becomes both uncensored and unmodified.

Figure 6:
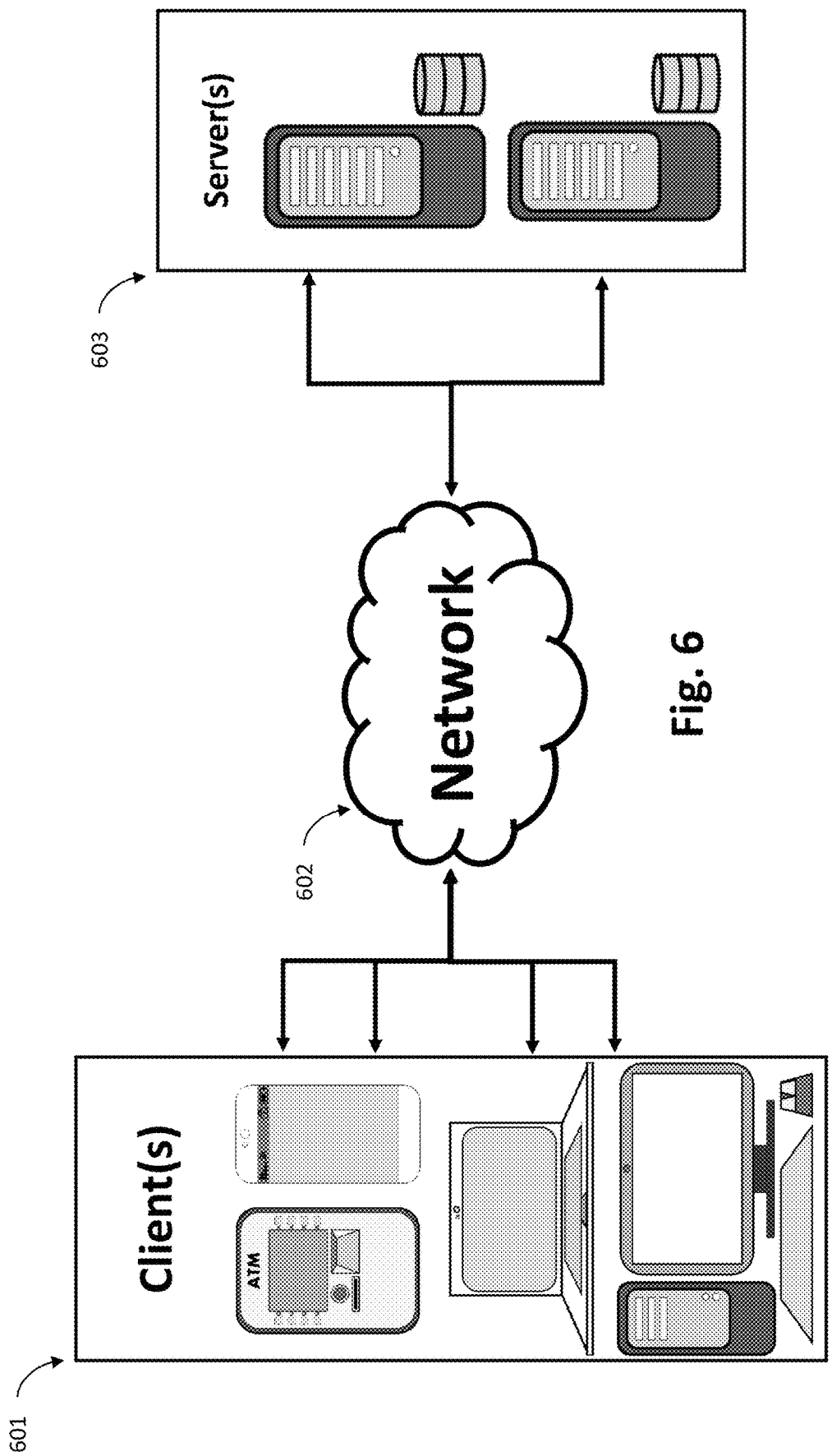
FIG. 6 depicts an exemplary system architecture which enables the prevention of visual hacking.

FIG. 6 illustrates an exemplary system architecture 600 includes client(s) [also known as device(s) wherein client and device is interchangeable in the context of this proposed technology] 601, a network 602 and server(s) 603 wherein the server(s) and the client(s) are connected via network 602. Each client 601 is configured to install and run both a native application and a web browser that is used to run web application. Any application that does not use web browser is considered as a native application, for example, windows desktop application, mac OS application, IOS application, android application, tablet application etc. The client 601 can be portable and non-portable. Clients can be, for example, desktop computers, laptop computers, ATM machines, mobile devices (such as smart phones, tablet, PDA), set top boxes, video game consoles, or any other devices having processor, memory and network and communication capabilities.

The web browser or native application installed on a client 601, is configured to load web pages or native application content from one or multiple servers 603 that host web application or server-side component of the native application. The server 603 can be any device having a processor, memory, network, communication capability to host the web application, server side component of the native application and able to store information into a database. By way of example, not limiting the scope of the invention, exemplary server can be any computer having an operating system (e.g. windows server), a web server (e.g. IIS) and a database (e.g. SQL Server). A skilled artisan would appreciate that in order to get performance gain, the database (e.g. SQL Server) can be installed on separate server different from the server that pays web server role. The network 602 can include, for example, any one or more of a personal area network (PAN), a local area network (LAN), a campus area network (CAN), a wide area network (WAN), a broad band network (BBN), metropolitan area network (MAN), the internet, and the like.

In one embodiment, having server 603 is optional wherein all instructions (i.e. source code of the application) resides at the client device 601 in order to have faster response avoiding client-server round trip.

Figure 7:
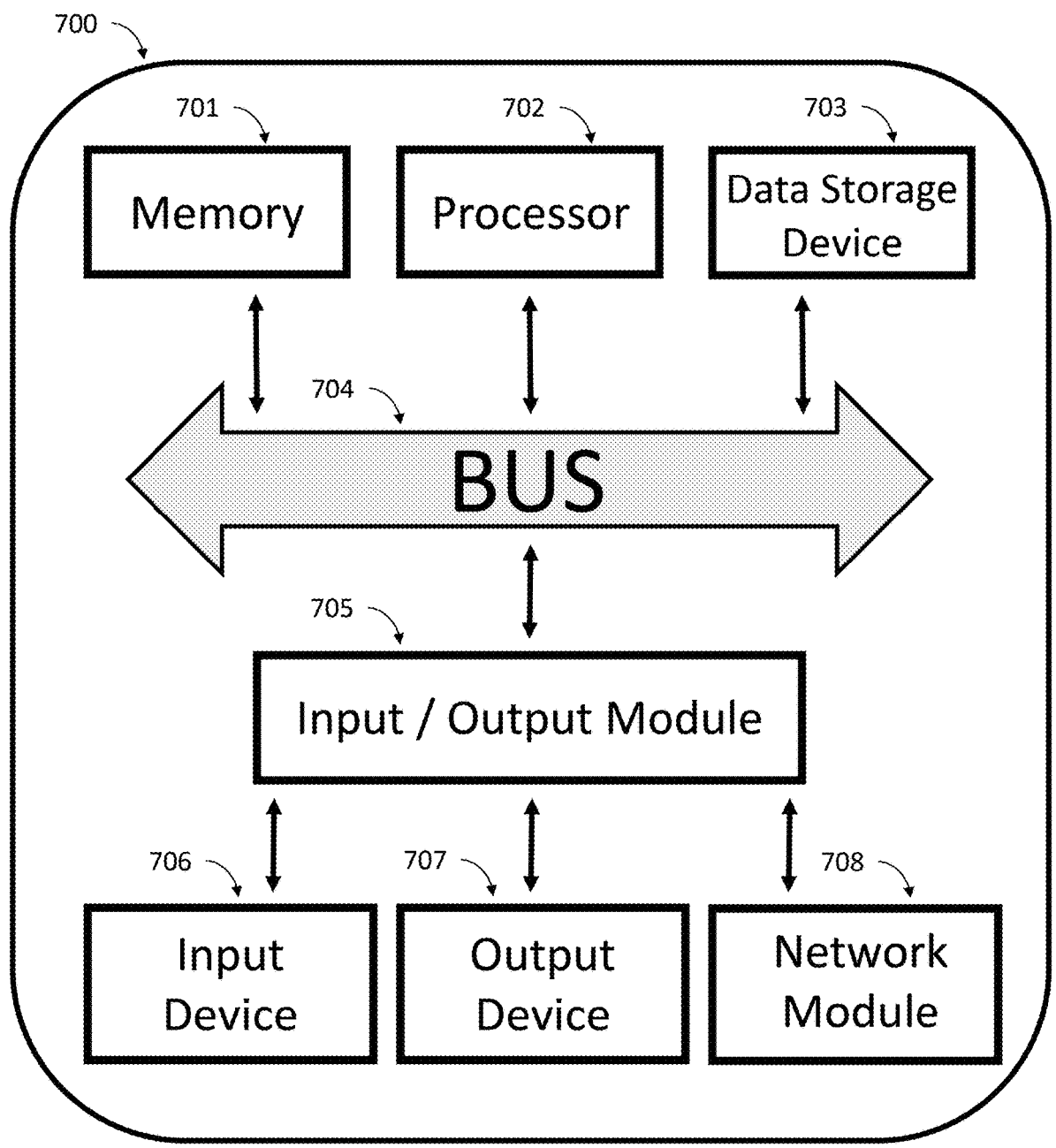
FIG. 7 depicts an exemplary computer system which connects both clients and servers.

FIG. 7 is a block diagram illustrating an exemplary computer system 700 that can be used to implement client 601 and server 603 of FIG. 6. Computer system 700 (e.g. client 601 and server 603) includes a bus 704 or other communication means to communicate information, and a processor 702 which is coupled with bus 604 to process information. The processor 702 can be a general purpose microprocessor, a microcontroller, a Central Processing Unit (CPU), a Digital Signal Processor (DSP), an Application Specific Integrated Circuit (ASIC), a Programmable Logic Device (PLD), a field Programmable Gate Array (FPGA), a controller, a gated logic, discrete hardware components or any other component that can perform calculations or other manipulations of the information. Besides hardware, the computer system 300 can include one or more software or computer program, code that creates execution environment for the one or more software or computer program, a protocol stack, a database management system, an operating system, or a combination of one or more of them stored in an included memory 701. The memory 701 can be a Random Access Memory (RAM), a flash memory, a Read Only Memory (ROM), Programmable Read Only Memory (PROM), an Erasable PROM, registers, removable disk, a CD-ROM, a DVD, a hard disk or any other appropriate storage device configured to couple with bus 704 for storing instructions and information to be executed by the processor 702. The instructions stored in the memory 701 may be implemented as one or more computer program products, for example, one or more modules or components of computer program instructions encoded on a computer readable medium for execution by the computer system 700 using any method well known to a skilled artisan, including, but not limited to, computer languages such as data-oriented language (e.g. SQL), system languages (e.g. C, objective-C, C++, Assembly), application languages (e.g. Languages used in .NET framework, for example, C#, Java, Visual Basic, PHP, Perl, Ruby, Python, HTML). The memory 301 can also be used to store temporary variables or other intermediate information during execution of the instructions to be executed by the processor 702.

The computer system 700 includes a data storage device 703. The data storage device 703 includes one or more machine readable storage medium to store data, by way of example, a Hard Disk Drive (HDD), a Solid State Drive (SSD), an Optical Disk Drive (ODD), a flash drive, Tape, or a combination of one or more of them. The one or more machine readable storage medium excludes any forms of transmission medium such as a carrier wave.

The computer system 700 can be coupled to multiple devices, such as an input device 706, and/or an output device 707 using Input/Output Module 705. The exemplary input/output module 705 includes data ports such as USB ports or the like. The exemplary input device 706 includes, for example, but not limited to, keyboard, mouse, stylus, touch screen or trackball by which user can provide input to the computer system 700. Other kinds of input device can also be used, such as tactile input device, visual input device, audio input device. By way of example, feedback provided to the user can be any form of sensory feedback, e.g., visual feedback, auditory feedback, or tactile feedback and input from the user can be received in any form including tactile, acoustic or speech. Exemplary output device 707 includes display devices, for example, but not limited to, a Liquid Crystal Display (LCD) monitor, a Cathode Ray Tube (CRT) monitor, a touch sensitive display or any device that is configured to display information to the user.

The input/output module 705 is further configured to connect to a network module 708 which includes a network interface cards (NIC), modems, Ethernet cards, network adapters or any devices that facilitate computer networking and send and receive information from one device to another device on the network.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for enhancing privacy on a device, the system including a display to render a content and the system comprising:
 a processor, the processor configured to execute the instructions to:
 authenticate a user on the device via secure means;
 provide the content to the user;
 monitor the presence of one or more spectators within a threshold wherein said threshold includes an inner threshold and an outer threshold, wherein said outer threshold comprises a range of the infrared (IR) camera's field of view (FOV) excluding said inner threshold wherein said outer threshold is used to monitor said one or more spectators who are looking towards the display without visibility of the content displayed to the user,
 wherein said inner threshold comprises a viewing range of the display wherein said inner threshold is used to monitor said one or more spectators who are looking towards the display with visibility of the content displayed to the user, wherein said inner threshold excludes the outer threshold;
 determine location of said one or more spectators and identify if said one or more spectators appeared within said outer threshold or said inner threshold;
 provide an alert of presence of said one or more spectators when said one or more appeared within said outer threshold or said inner threshold,
 wherein the alert varies depending on the configuration of the system by the user, wherein the alert includes a plurality of styles of alert banners,
 wherein the plurality of styles of alert banners comprises:
 a first alert banner which includes at least a face of the one or more spectators; and
 a second alert banner which includes at least a location of the one or more spectators wherein the location is relative to the user; and
 alert said content based on said determined location of said one or more spectators.

2. The system of claim 1, wherein the alteration is based on said user's preferences.

3. The system of claim 1, wherein said alteration includes a censorship or a modification.

4. The system of claim 3, wherein said alteration of said is the modification of said content when the one or more spectators is within the outer threshold.

5. The system of claim 4, wherein the modification of said content is based on a type of the content.

6. The system of claim 5, wherein the type of the content includes a text, an image, or a video.

7. The system of claim 3, wherein said alteration of said content is the censorship of said content when the one or more spectators is within the inner threshold.

8. The system of claim 7, wherein said censorship associated with stopping display of the content.

* * * * *